United States Patent
Novack

(10) Patent No.: US 9,979,713 B2
(45) Date of Patent: *May 22, 2018

(54) SCORED FACTOR-BASED AUTHENTICATION

(71) Applicant: AT&T Intellectual Property I, L.P., Atlanta, GA (US)

(72) Inventor: Brian M. Novack, St. Louis, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/206,608

(22) Filed: Jul. 11, 2016

(65) Prior Publication Data

US 2016/0323258 A1    Nov. 3, 2016

Related U.S. Application Data

(63) Continuation of application No. 14/034,831, filed on Sep. 24, 2013, now Pat. No. 9,391,968.

(51) Int. Cl.
  *H04L 29/06* (2006.01)
(52) U.S. Cl.
  CPC .......... *H04L 63/08* (2013.01); *H04L 63/1433* (2013.01); *H04L 63/20* (2013.01); *H04L 63/10* (2013.01); *H04L 2463/082* (2013.01)
(58) Field of Classification Search
  CPC ..... H04L 63/08; H04L 63/1433; H04L 63/20; H04L 63/10; H04L 63/6218
  See application file for complete search history.

(56) References Cited

U.S. PATENT DOCUMENTS

| | | | |
|---|---|---|---|
| 5,226,079 A | 7/1993 | Holloway | |
| 6,655,585 B2 | 12/2003 | Shinn | |
| 7,231,657 B2 | 6/2007 | Honarvar et al. | |
| 8,189,878 B2 | 5/2012 | Shultz | |
| 8,281,370 B2 * | 10/2012 | Robbins | G06F 21/6245 709/218 |
| 8,307,412 B2 | 11/2012 | Ozzie et al. | |
| 8,307,414 B2 | 11/2012 | Zerfos et al. | |

(Continued)

FOREIGN PATENT DOCUMENTS

EP    1202228    5/2002

OTHER PUBLICATIONS

Lawrence O'Gorman, "Comparing Passwords, Tokens, and Biometrics for User Authentication," Dec. 2003, pp. 2019-2040, vol. 91, No. 12, Proceedings of the IEEE.

(Continued)

*Primary Examiner* — Ali Abyaneh
*Assistant Examiner* — Shaqueal Wade
(74) *Attorney, Agent, or Firm* — Hartman & Citrin LLC

(57) ABSTRACT

Concepts and technologies are disclosed herein for scored factor-based authentication. A verification service can receive an authentication request from a requestor, wherein the authentication request identifies a transaction. The verification service can determine a risk associated with the transaction, an authentication score based upon the risk, and a number of groups of authentication factors, each of which can satisfy the authentication score. The verification service can provide factor group data identifying the number of groups of authentication factors to the requestor.

20 Claims, 11 Drawing Sheets

(56) References Cited

U.S. PATENT DOCUMENTS

| | | | |
|---|---|---|---|
| 8,584,219 B1 * | 11/2013 | Toole | G06F 21/60 |
| | | | 726/25 |
| 8,776,168 B1 | 7/2014 | Gibson et al. | |
| 2004/0078567 A1 | 4/2004 | Newbould | |
| 2004/0128498 A1 | 7/2004 | Lang et al. | |
| 2005/0261926 A1 | 11/2005 | Hartridge | |
| 2009/0199264 A1 | 8/2009 | Lang | |
| 2009/0288147 A1 | 11/2009 | Yeung | |
| 2009/0309698 A1 | 12/2009 | Headley et al. | |
| 2010/0063935 A1 | 3/2010 | Thomas et al. | |
| 2010/0325002 A1 | 12/2010 | Rothschild | |
| 2011/0191200 A1 | 8/2011 | Bayer et al. | |
| 2011/0231911 A1 | 9/2011 | White et al. | |
| 2012/0297183 A1 | 11/2012 | Mukkara et al. | |
| 2013/0055346 A1 | 2/2013 | Singh et al. | |
| 2013/0227651 A1 | 8/2013 | Schultz et al. | |
| 2014/0090090 A1 * | 3/2014 | Vasireddy | G06F 21/577 |
| | | | 726/30 |

OTHER PUBLICATIONS

Jim Reno, "Multifactor Authentication: Its Time Has Come," Aug. 2013, Technology Innovation Management Review.
U.S. Office Action dated May 21, 2015 in U.S. Appl. No. 14/034,831.
U.S. Notice of Allowance dated Feb. 22, 2016 in U.S. Appl. No. 14/034,831.

* cited by examiner

SCORED FACTOR-BASED AUTHENTICATION

CROSS-REFERENCE TO RELATED APPLICATIONS

This application is a continuation of and claims priority to U.S. patent application Ser. No. 14/034,831, entitled "Scored Factor-Based Authentication," filed Sep. 24, 2013, now U.S. Pat. No. 9,391,968, which is incorporated herein by reference in its entirety.

BACKGROUND

This application relates generally to authentication. More specifically, the disclosure provided herein relates to using a quantified approach to provide scored factor-based authentication.

Because of the proliferation of computing devices throughout almost every aspect of daily life, an increasing number of people use computing devices on a daily basis. The use of computing devices has pervaded almost every aspect of daily life, and the increasing sophistication and popularity of smartphones and/or other portable devices has ensured that a large percentage of human beings in the world have the ability to interact with remote computing systems on an almost constant as-desired basis.

While the proliferation of computing access has created an enormous amount of opportunity, the need to identify users and/or their devices has become extremely important. For example, while only five years ago the average person went to a brick-and-mortar financial institution to conduct any sort of financial transaction, many smartphone users today are able to deposit checks, transfer funds, and/or make payments via a smartphone without ever entering into a bank or similar location. Similarly, many modern smartphone users today are able to execute securities trades over the internet from a smartphone, activities that until recently may never have even been contemplated.

To allow mobile users to undertake these complex and security-intense transactions, various authentication approaches have been used. Most of these approaches are based upon categories of authentication factors such as information known by only the real user, information possessed by only the real user, and/or something inherent to only the real user. Sometimes, authentication approaches combine factors to provide multi-factor authentication. While these approaches provide some level of security, many of the relied-upon factors do not provide nonrepudiation to a degree at which the authenticating system can be somewhat sure that the entity providing the information cannot dispute the authenticity of the communication via which the information was provided.

While the layering and/or combination of factors into various authentication schemes may be helpful in some embodiments, these factors may be chosen based upon the ability or ease with which the average user can respond. The combinations may or may not provide a heightened level of nonrepudiation, and as such, may provide limited benefit when compared to the traditional single-factor authentication techniques described above.

SUMMARY

The present disclosure is directed to scored factor-based authentication. An authentication service can obtain and store authentication data. The authentication data can include various types of information such as, for example, information defining various transactions and/or types of transactions; information defining risks associated with various transactions and/or types of transactions; information defining multiple authentication factors and various aspects of the authentication factors such as relative strength of the factors, nonrepudiation aspect strengths of the factors, or the like; nonrepudiation connection strength of various types of network connections; user information defining users and/or information associated with the users such as biometric information, demographic information, passwords, or the like; score information for defining how authentication scores are to be calculated; other information, or the like.

The authentication service can receive a request for authentication. The authentication request can be generated by various entities such as, for example, a resource such as a web site, an application, or the like. The request for authentication can include information defining the transaction for which authentication is requested. Based upon the information defining the transaction and the authentication data, the authentication service can determine a risk associated with the transaction. The risk can subjectively define a risk associated with allowing an unauthorized entity to conduct the transaction at issue. A banking transaction, for example, may have a higher risk than a request for sports scores or a recipe, or the like.

Based upon the determined risk, the authentication service can determine an authentication score to be enforced for the transaction that triggered the authentication request and/or a different transaction. The score can be based upon the risk and/or can be based upon various other considerations. In some embodiments, the authentication data can include information that associates the risk with an authentication score. In some other embodiments, the authentication data can define formulae that, when applied to a determined risk, provide an authentication score to be enforced against the transaction.

The authentication score also can define a combined weight or value of a combination of authentication factors. Thus, for example, the authentication score associated with a combination of authentication factors may be based upon a formula that relates a relative strength of the authentication factor, a nonrepudiation connection strength of a connection used for the transaction, and/or a nonrepudiation aspect strength for the authentication factor at issue. Thus, the authentication service can generate one or more combinations of authentication factors that meet the desired or determined authentication score. In some embodiments, the authentication service can generate two or more combinations of authentication factors for selection by a user or other entity.

A user or other entity can be presented with the authentication factors and can choose a combination of factors, also referred to herein as a factor group. The user or other entity also can provide responses to the authentication factor challenges such as, a fingerprint in response to fingerprint authentication factor, or the like. Data input including one or more of a factor group choice and responses to the authentication factors included in the chosen factor group can be passed to the authentication service. The authentication service can determine if the user or other entity is to be authenticated, and can provide an authentication result to requestor such as the resource. Thus, embodiments of the concepts and technologies described herein allow a high level of security while allowing a user or other entity to select a combination of authentication factors that satisfy a determined authentication score to be enforced against a transaction.

According to one aspect of the concepts and technologies disclosed herein, a method is disclosed. The method can include receiving, at a computing device that executes an authentication service, an authentication request from a requestor. The authentication request can identify a transaction associated with the requestor. The method also can include determining, by the computing device, a risk associated with the transaction, and an authentication score based upon the risk. The authentication score can include a level of nonrepudiation to be satisfied during authentication to allow execution of the transaction. The method also can include determining, by the computer, two or more groups of authentication factors. Each of the two or more groups of authentication factors can satisfy the authentication score. The method also can include providing, by the computer, factor group data identifying the two or more groups of authentication factors to the requestor.

In some embodiments, determining the authentication score can include analyzing the risk and analyzing score data to determine the authentication score. A one of the two or more groups of authentication factors can include two or more authentication factors determined based upon a product of a relative strength and a nonrepudiation aspect strength determined for each of the two or more authentication factors. In some embodiments, one of the two or more groups of authentication factors can include two or more authentication factors determined further based upon a nonrepudiation connection strength associated with the transaction.

In some embodiments, determining the risk associated with the transaction can include analyzing the authentication data to determine a risk based upon an identification of the transaction included in the authentication request and a transaction definition included in the authentication data. In some embodiments, the requestor can include a web server that hosts a web application, and the transaction can include an action executed by the web application. In some embodiments, the method further can include receiving, by the computing device, data input including a factor group choice and responses associated with the authentication factors, determining, by the computing device, if the data input satisfies an authentication requirement, and providing, by the computing device, an authentication result to the requestor.

In some embodiments, the method also can include receiving, by the computing device, authentication data from an authentication data source, and storing, by the computing device, the authentication data at a data store. In some embodiments, the authentication data can include risk data that defines a transaction and a risk associated with the transaction, factor data defining authentication factors, and score data defining how the authentication score is determined based upon the risk determined.

According to another aspect of the concepts and technologies disclosed herein, a system is disclosed. The system can include a processor and a memory. The memory can store computer-executable instructions that, when executed by the processor, cause the processor to perform operations. The operations can include receiving an authentication request from a requestor. The authentication request can identify a transaction associated with the requestor. The operations further can include determining a risk associated with the transaction, and determining an authentication score based upon the risk. The authentication score can include a level of nonrepudiation to be satisfied during authentication to allow execution of the transaction. The operations further can include determining two or more groups of authentication factors. Each of the two or more groups of authentication factors can satisfy the authentication score. The operations also can include providing factor group data identifying the two or more groups of authentication factors to the requestor.

In some embodiments, the requestor can include a web server that hosts a web application, and the transaction can include an action executed by the web application. The requestor also can include a user device that accesses an authentication service. In some embodiments, the system further includes computer-executable instructions that, when executed by the processor, cause the processor to perform operations further including receiving data input including a factor group choice and responses associated with the authentication factors, determining if the data input satisfies an authentication requirement, and providing an authentication result to the requestor. The system also can include an authentication data source and a data store. In some embodiments, the system further can include computer-executable instructions that, when executed by the processor, cause the processor to perform operations further including receiving authentication data from the authentication data source, and storing the authentication data at the data store.

According to yet another aspect of the concepts and technologies described herein, a computer storage medium is disclosed. The computer storage medium has computer-executable instructions stored thereon that, when executed by a processor, cause the processor to perform operations including receiving an authentication request from a requestor, wherein the authentication request identifies a transaction associated with the requestor, and determining a risk associated with the transaction. The operations further can include determining an authentication score based upon the risk. The authentication score can include a level of nonrepudiation to be satisfied during authentication to allow execution of the transaction. The operations further can include determining two or more groups of authentication factors, wherein each of the two or more groups of authentication factors satisfies the authentication score, and providing factor group data identifying the two or more groups of authentication factors to the requestor.

In some embodiments, the computer storage medium further includes computer-executable instructions that, when executed by the processor, cause the processor to perform operations further including receiving data input including a factor group choice and responses associated with the authentication factors, determining if the data input satisfies an authentication requirement, and providing an authentication result to the requestor. The authentication requirement can include a level of nonrepudiation, and the level of nonrepudiation can be based upon the authentication score. In some embodiments, the computer storage medium can include computer-executable instructions that, when executed by the processor, cause the processor to perform operations further including receiving authentication data from an authentication data source, and storing the authentication data at a data store. In some embodiments, the computer storage medium further can include computer-executable instructions that, when executed by the processor, cause the processor to perform operations further including receiving data input including information identifying a factor group choice made via a user interface presented at a user device in communication with the resource, and information corresponding to responses associated with a two or more authentication factors associated with the authentication factor group associated with the factor group choice.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
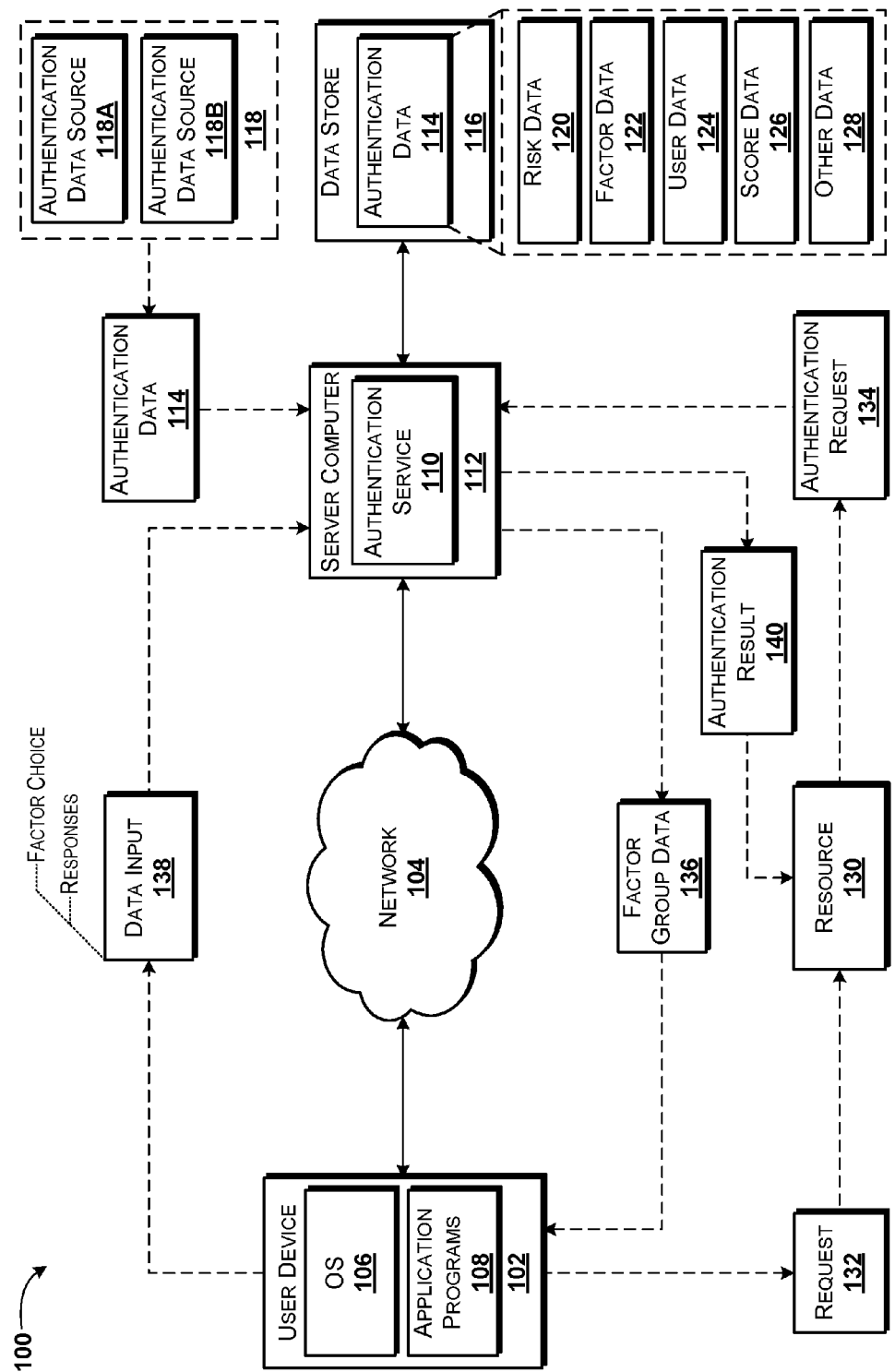
FIG. 1 is a system diagram illustrating an illustrative operating environment for the various embodiments disclosed herein.

The following detailed description is directed to providing scored factor-based authentication. An authentication service can obtain and store authentication data that can include various types of information that can be used by the authentication service to provide scored factor-based authentication. The authentication data can include risk data, score data, factor data, user data, other data, combinations thereof, or the like. The authentication service can receive a request for authentication. The authentication request can be generated by various entities such as, for example, a resource such as a web site, an application, or the like. The request for authentication can include information defining the transaction for which authentication is requested.

The authentication service can analyze the information defining the transaction and the authentication data to determine a risk associated with the transaction. In some embodiments, the risk can be used to subjectively define a risk associated with allowing an unauthorized entity to conduct the transaction at issue. Based upon the determined risk, the authentication service can determine an authentication score to be enforced for the transaction that triggered the authentication request and/or a different transaction. The authentication score can be based upon the risk and/or can be based upon various other considerations. In some embodiments, for example, the authentication data can include information that associates a risk determined for a transaction with an authentication score. In some other embodiments, the authentication data can define formulae that, when applied to a determined risk, provide an authentication score to be enforced against the transaction.

The authentication score also can define a combined weight or value of a combination of authentication factors. The authentication service can generate one or more combinations of authentication factors that meet the desired or determined authentication score. In some embodiments, the authentication service can generate two or more combinations of authentication factors for selection by a user or other entity. A user or other entity can be presented with the authentication factors, for example via a user interface presented by a user device, and a combination of factors can be chosen.

The user or other entity also can provide responses to the authentication factor challenges such as, a password in response to a password authentication factor, an iris scan in response to an iris can authentication factor, or the like. Data input including one or more of a factor group choice and responses to the authentication factors included in the chosen factor group can be transmitted to the authentication service. The authentication service can determine if the user or other entity is to be authenticated, and can provide an authentication result to requestor such as the resource. Thus, embodiments of the concepts and technologies described herein can provide authentication techniques that satisfy security requirements while providing flexibility to users or other entities to allow the users or other entities to select a combination of authentication factors that satisfy a determined authentication score to be enforced against a transaction.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for providing and interacting with an authentication service will be described, according to an illustrative embodiment. The operating environment 100 shown in FIG. 1 includes a user device 102 operating in communication with and/or as part of a communications network ("network") 104.

According to various embodiments, the functionality of the user device 102 may be provided by one or more smartphones, feature phones, personal digital assistants ("PDAs"), laptop computers, tablet computers, other mobile computing devices, a vehicle computing system, a smart watch, a mobile media device, other computing systems, combinations thereof, or the like. It should be understood that the functionality of the user device 102 can be provided by a single device and/or by multiple devices. For purposes of describing the concepts and technologies disclosed herein, the user device 102 is described herein as a computing device such as a smartphone, a tablet computer, or a personal computer. It should be understood that this embodiment is illustrative, and should not be construed as being limiting in any way.

The user device 102 can execute an operating system 106, one or more application programs (not shown in FIG. 1), and an authentication application 108. The operating system 106 can include an executable program that controls the operation of the user device 102. The application programs and/or the authentication application 108 can include executable programs configured to execute on top of the operating system 106 to provide various functions. In some embodiments, the application programs can include, but are not limited to, web browsers, web applications, mail applications, native applications, media applications, camera and/or video applications, combinations thereof, or the like. Because various embodiments of application programs are generally known, the application programs are not described in additional detail herein.

The authentication application 108 can be configured to provide the functionality described herein for providing and/or interacting with an authentication service and/or for providing scored factor-based authentication. According to various embodiments, the authentication application 108 is configured to communicate with an authentication service 110 that is hosted and/or executed by a computing system such as, for example, the server computer 112. The functionality of the server computer 112 can be provided by one or more real or virtual computing resources. Furthermore, it should be understood that the server computer 112 can be provided by multiple distributed computing resources, if desired. As such, the illustrated embodiment showing a single server computer 112 is illustrative and should not be construed as being limiting in any way.

According to various embodiments of the concepts and technologies described herein, the authentication service 110 can provide authentication services to one or more users or other callers such as, for example, web sites, services, applications, devices, or the like. For example, the authentication service 110 can be called as a service or virtual service by a banking application hosted by a web server, or the like. In some other embodiments, for example, various devices such as the user device 102 can call the authentication service 110 and/or interact with the authentication service 110 to create and/or manage settings, rules or preferences, to activate and/or to deactivate the authentication service 110, to request authentication via the authentication service 110, to request authentication of a requestor via the authentication service 110, combinations thereof, or the like. Because the authentication service 110 can be called for various purposes as will be described in additional detail herein, it should be understood that these examples are illustrative and therefore should not be construed as being limiting in any way. Additional functionality of the authentication application 108 will be more clearly understood after more fully describing the authentication service 110. As such, the authentication application 108 is described in additional detail below.

In the illustrated embodiment, the authentication service 110 executed by the server computer 112 can be configured to generate or obtain authentication data 114. As used herein, the term "authentication data" and variants thereof can include, but is not necessarily limited to, data defining how and when the authentication service 110 is to be activated; settings, configurations, and/or preferences; event and/or transaction definitions; risks, risk definitions, and/or other risk information; authentication factors and/or definitions of authentication factors; user identifiers and/or other information identifying users; data defining scores and/or algorithms for generating scores; combinations thereof; or the like.

The authentication service 110 can be configured to store the authentication data 114 at a local or remote data storage location. The data storage location can include one or more real or virtual data storage locations such as, for example, a memory, a server computer, a database, a data store, or the like. In the illustrated embodiment of FIG. 1, the authentication service 110 can be configured to store the authentication data 114 at a data store 116. The functionality of the data store 116 can be provided by one or more server computers, databases, laptop computers, flash memory devices, hard drives, virtual storage resources, combinations thereof, or the like. The authentication service 110 also can be configured to access the authentication data 114 to provide the functionality described herein for providing a remotely activated authentication service.

In some embodiments, the authentication service 110 can be configured to receive or obtain the authentication data 114 from one or more authentication data sources 118A-B (hereinafter collectively and/or generically referred to as "authentication data sources 118"). The authentication data sources 118 can include, for example, servers or databases, applications, devices, users, or the like. In some embodiments, one or more of the authentication data sources 118 can include a database or server that is configured to provide data defining transactions and/or risks associated with the transactions, authentication factor definitions and/or associated strength information, information defining how authentication scores are defined and/or algorithms for generating authentication scores (also referred to herein as "scores"), combinations thereof, or the like.

As will be explained in more detail below, the authentication service 110 can access and analyze the authentication data 114. The authentication service 110 can be configured to determine if a device or user is to be authenticated based upon the authentication data 114 and/or data provided by an entity attempting to authenticate. Because the functionality described herein for providing scored factor-based authentication can be provided in a variety of ways and/or can entail additional and/or alternative devices and/or functionality, it should be understood that the example shown in FIG. 1 is illustrative and therefore should not be construed as being limiting in any way.

In the illustrated embodiment, the authentication data 114 includes, but may not necessarily be limited to, risk data 120, factor data 122, user data 124, score data 126, other data 128, combinations thereof, or the like. Some examples of each of these types of data are described below. Because the authentication data 114 can include these and/or other types of data, and because the authentication data 114 can omit the above-mentioned (and further described below) types of data, it should be understood that these examples are illustrative. As such, the illustrated embodiment should not be construed as being limiting in any way.

The risk data 120 can include, for example, data that defines risk associated with particular transactions, transaction types, or the like. Thus, the risk data 120 can include transaction definitions that define particular transactions and/or types of transactions, as well as risks associated with these transactions or types of transactions. Thus, the risk data 120 can include, for example, data defining geographic locations of transactions, dollar amounts of transactions, transaction frequency, times of day, network resources, or the like, that may define a transaction and/or a risk associated with the transaction. The risk data 120 also can include data that defines other situations or circumstances associated with transactions and/or risks of transactions.

In one example of the risk data 120 (provided herein for illustrative purposes), the risk data 120 can define a transaction or transaction type as a financial transaction (e.g., a balance inquiry or account transfer). The risk data 120 can define a risk associated with a financial transaction. The risk data 120 also can define variables associated with financial transactions and risk or risks associated with those variables. For example, the risk data 120 can specify that financial transactions above a particular amount have a particular risk. The risk data 120 also can specify that financial transactions across state or country lines may have a particular risk. The risk data 120 also can specify risks associated with financial transactions between two or more accounts or institutions and variables such as where the institutions are the same or different, when account holders are the same or different, or the like. Because the risk data 120 can define transactions and risks associated with almost any kind of transaction (and not only financial transactions), it should be understood that these examples are illustrative and therefore should not be construed as being limiting in any way.

The factor data 122 can include, for example, definitions of authentication factors. The factor data 122 also can include data defining absolute or relative strength of various authentication factors. Thus, for example, the factor data 122 can include data defining authentication factors such as personal identification numbers ("PINs"), user identifiers ("UIDs" or "userIDs"), passwords, passphrases, challenge questions, cards, public-key infrastructure ("PKI") elements or functionality, devices, software one-time passwords ("OTPs"), hardware OTP, biometric factors such as voice, fingerprints, iris scans, deoxyribonucleic acid ("DNA") information, combinations thereof, or the like. The factor data 122 also can include information defining or setting a relative or absolute strength for the factors and/or combinations of factors. Thus, for example, the factor data 122 can define a first strength (a baseline strength or an absolute strength) for a first authentication factor and a second strength (relative to the first strength, or an absolute strength) for a second authentication factor.

In one example embodiment, the factor data 122 can define a password or userID as having a first strength (typically low), and a biometric identifier such as a fingerprint or iris scan as having a second strength that is high relative to the first strength. The factor data 122 can define some or all authentication factors and their absolute or relative strength for use in calculating an authentication score for a particular combination of authentication factors. Thus, in some embodiments the factor data 122 can be used to select and combine multiple authentication factors to match a determined risk and/or authentication score. This and other aspects of the authentication factors will be described in more detail below.

The user data 124 can include, for example, data that identifies and/or defines one or more users. In some embodiments, the user data 124 may define or identify a user of the user device 102, for example, though the user data 124 can define or identify almost any user and is not limited to defining or identifying a user of the user device 102. The user data 124 can include, but is not limited to, user information such as names, dates of birth, social security numbers, address information, age information, combinations thereof, or the like.

The user data 124 also can include biometric information such as, for example, voiceprint information associated with users, fingerprint information associated with users, DNA or blood type information associated with users, iris scan information associated with users, combinations thereof, or the like. The user data 124 also can include other user information such as login information, passwords, combinations thereof, or the like. Because the user data 124 can include additional or alternative information that identifies the user and/or other information about the user, it should be understood that the above examples are illustrative and therefore should not be construed as being limiting in any way.

The score data 126 can define, for example, one or more definitions or algorithms for determining an authentication score. The score data 126 can define how an authentication score is to be determined based upon various aspects of a transaction and/or based upon identification of a risk associated with a particular transaction. In some embodiments, the score data 126 can define formulae for determining an authentication score based upon various variables such as, for example, nonrepudiation connection strength, nonrepudiation aspect strength, and/or an authentication relative strength associated with a particular authentication factor. Because the score data 126 can define formulae that include and/or are based upon other variables, it should be understood that this example is illustrative and therefore should not be construed as being limiting in any way.

In one contemplated embodiment, the score data 126 can define relative strengths of various authentication factors. In one example, a relatively weak authentication factor such as a PIN may have a relative or absolute aspect authentication relative strength of about one on a scale of one to ten. By way of comparison, a biometric based authentication factor such as an iris scan may have a relative or absolute aspect authentication relative strength of about ten on the scale of one to ten. It should be understood that these examples are illustrative and therefore should not be construed as being limiting in any way.

The score data 126 also can define nonrepudiation connection strength for a connection over which the transaction is occurring. For example, the nonrepudiation connection strength of a direct physical connection can be defined by the score data 126 as being two on a scale of one to two, while a remote logical connection may be defined by the score data 126 as being about 0.2 or even zero. It should be understood that these examples are illustrative and therefore should not be construed as being limiting in any way.

The score data also can define a nonrepudiation aspect strength for authentication factors. The nonrepudiation aspect strength can define, for example, one, two, three, or more than three categories of authentication factors and associated values associated with these categories. In one contemplated embodiment, the nonrepudiation aspect strength includes three categories, namely "something known" by the real user, "something in possession" of the real user, and/or "something the real user is." For example, the "something known" by the real user can include a date of birth, a social security number, a password, or the like. This information may be easy to discover and therefore may be defined by the score data 126 as being about 0.2 or even zero.

The "something in possession" by the real user can include a token, a certificate, a hardware device, or the like. Because these items must be in the possession of the requestor to authenticate, these types of authentication factors may be assigned a higher relative strength such as, for example, from about 0.8 to about 1.2 on a scale of one to two. The "something the real user is" may be the strongest category since these types of authentication factors may not be capable of being stolen or taken possession of by the average person. These types of authentication factors can include, for example, biometric information, or the like. Thus, the score data 126 may assign a strength from about 1.4 to about 2.0 on a scale of one to two for these types of authentication factors. Because the authentication factors and/or the strengths discussed above are illustrative, it should be understood that these examples are illustrative and therefore should not be construed as being limiting in any way.

The score data 126 also can define one or more formulae for defining an authentication score. In one contemplated embodiment, the authentication score can include a formula that defines the authentication score as a product of the nonrepudiation aspect strength, the nonrepudiation connection strength, and/or the authentication relative strength. A combination of multiple authentication factors can be added together to achieve a particular score. Thus, for example, a password authentication factor could be assigned an authentication relative strength of about 0.2 and nonrepudiation aspect strength of about 0.2. If the password is submitted over a remote logical connection (which may have a score of about 0.2), the determined factor score for the password may be calculated as the authentication relative strength (0.2) times (the nonrepudiation aspect strength (0.2) plus the nonrepudiation connection strength (0.2)), or 0.2(0.4) or 0.8.

If the authentication service 110 determines that the authentication score to be enforced for a particular transaction is equal to or greater than ten, for example, the use of a password will clearly not suffice and therefore must be combined with other authentication factors. If an iris scan is used in combination with the password over the same remote logical connection, for example, the total score may be 1.8(0.2+1.8)=3.6. Thus, it can be understood that various authentication factors may be required to comply with a determined score to be enforced against a particular transaction.

The other data 128 can include, but is not limited to, user, software, and/or service software settings, options, parameters, and/or other configuration information associated with the authentication service 110. Some examples of user and/or application preferences will be illustrated and described in additional detail herein, particularly with reference to FIG. 4A below. Briefly, the preferences can define, for example, what types of factors are to be allowed or required for authentication as part of a scored factor-based authentication approach. Thus, the preferences can include, for example, options for enabling or disabling particular types of data and/or sensors for obtaining those data, types of data and/or data sources that are to be used or not used, combinations thereof, or the like.

The other data 128 also can include location data or location information. The location data or location information can indicate or represent one or more geographic locations. The geographic locations can be used to determine risks associated with transactions, to weight authentication factors, and/or to calculate the scores described herein. The location data or location information can be captured by a location server, the user device 102, and/or other devices or hardware using various location-determination technologies. For example, the user device 102 can include one or more global positioning system ("GPS") receivers via which the user device 102 can determine a location of the user device 102. Additionally or alternatively, the user device 102 can use one or more assisted GPS ("A-GPS") technologies to determine location such as, for example, scanning a proximity associated with the user device 102 to determine one or more wireless network equipment identities, location beacons, or the like in communication with the user device 102. Additionally, or alternatively, the user device 102 can execute one or more location determination applications configured to determine a location of the user device 102 by monitoring movements of the user device using various sensors such as, for example, magnetometers, accelerometers, gyroscopes, or the like.

The user device 102, a network device or software in communication with the server computer 112, and/or a location server can rely upon triangulation techniques to determine a location associated with the user device 102 and/or other devices, users, or resources. For example, the user device 102 can communicate with three or more cellular towers or other wireless transmitters and/or transceivers to determine a location of the user device 102 using triangulation. Additionally, or alternatively, the authentication service 110 can obtain location data from a cellular network and/or other networks or devices relating to a particular user or device such as the user device 102. Because various technologies and/or combinations thereof can be used to determine location, it should be understood that these examples are illustrative and therefore should not be construed as being limiting in any way.

As noted above, the authentication data 114 can be stored at the data store 116 and can be used by the authentication application 108 and/or the authentication service 110 to provide the functionality described herein for providing scored factor-based authentication. The authentication service 110 can access the authentication data 114 to identify risk data 120, factor data 122, user data 124, score data 126, and/or other data 128 associated with a particular user and/or user device 102, and use that data to provide the functionality described herein.

As will be explained in more detail below, the user device 102 and/or other devices or systems may access a resource 130. The resource 130 can include, for example, a web site, a web application, a service, or the like. The user device 102 may access the resource 130 for various purposes such as, for example, to conduct a transaction. In one contemplated example, the resource 130 can include a banking server, and the transaction can include a financial transaction. It should be understood that this example is illustrative and therefore should not be construed as being limiting in any way.

In some embodiments, the user device 102 accesses the resource 130 via a request 132. The request 132 can include a query or a command to initiate a transaction. The resource 130 can receive the request 132 and respond to the request 132 by taking the requested action. In some embodiments, the resource 130 may respond to the request 132 by requesting authentication of the user device 102. In some embodiments, the resource 130 can directly authenticate the user device 102, and in some other embodiments, the resource 130 can generate an authentication request 134 for requesting that the authentication service 110 authenticate the user device 102. According to various embodiments, the authentication request 134 can include various types of transaction information such as, for example, information identifying the user involved in the transaction, transaction parameters (e.g., location, time of day, transaction type, involved institutions or parties, etc.), combinations thereof, or the like.

As will be explained in more detail below, the authentication service 110 can analyze the authentication request 134 and/or the transaction information included in the authentication request 134. The authentication service 110 can determine, based upon the authentication request 134, a transaction or transaction type being conducted at the resource 130. It should be understood that in some embodiments, the resource 130 can be configured to explicitly identify a known transaction or transaction type based upon known or shared transaction definitions and/or transaction type definitions.

The authentication service 110 can access the authentication data 114 from the data store 116, or from one or more authentication data sources 118, and analyze the authentication data 114. During the analysis of the authentication data 114, the authentication service 110 can determine a transaction or a transaction type for which authentication is being requested, for example by way of the authentication request 134. It can be appreciated from the above description of the authentication data 114, that the authentication service 110 can determine the transaction and/or transaction type based upon the risk data 120, for example.

The authentication service 110 also can determine, based upon the determined transaction and/or transaction type, a risk associated with the transaction. It can be appreciated from the description above that the risk can define a degree of damage or risk associated with allowing the transaction to occur without correct authentication. For example, if the transaction includes a request for weather information, the authentication service 110 can determine that the transaction has a first amount or degree of risk. This amount or degree of risk may be small relative to a second amount or degree of risk that may be determined if the transaction includes a request for an account transfer from one institution to second institution in a different country. It should be understood that this example is illustrative and therefore should not be construed as being limiting in any way.

Based upon the determined risk, which may be defined as a numerical value (e.g., a risk on a scale of one to ten, one to one hundred, or the like) and/or as a degree of risk (e.g., low, medium, high, etc.), the authentication service 110 can determine an authentication score. The authentication service 110 can determine the authentication score in a number of ways. In one contemplated embodiment, the authentication service 110 can access the score data 126 to identify an authentication score associated with the determined risk. It should be understood that this example is illustrative and therefore should not be construed as being limiting in any way.

As explained above, the score data 126 can define, for example, that a transaction with a risk of X should only be completed if the requestor successfully authenticates using authentication factors that in combination have an authentication score defined by the score data 126. It should be understood that this example is illustrative and therefore should not be construed as being limiting in any way. Thus, the authentication service 110 can determine the transaction or transaction type, a risk associated with the transaction or transaction type, and an associated authentication score that is to be enforced based upon the determined risk.

Based upon the determined authentication score, the authentication service 110 can determine at least two groups of authentication factors that, if applied during authentication of the requestor, would result in a high degree of certainty that the requestor is authorized to conduct the transaction. The authentication service 110 can identify at least two groups of authentication factors and provide data that identifies the groups of factors ("factor group data") 136 to the requestor. As shown in the embodiment shown in FIG. 1, the authentication service 110 can provide the factor group data 136 to the requestor directly. In some other embodiments, the authentication service 110 can provide the factor group data 136 to the resource 130, and the resource 130 can pass the factor group data 136 or a modified version thereof to the requestor.

The requestor can receive the factor group data 136, a modified version of the factor group data 136, or other data identifying the groups of authentication factors. In the embodiment illustrated in FIG. 1, wherein the user device 102 is the requestor, the factor group data 136 can be provided to the user device 102. The user device 102 can generate a user interface at the user device 102 for presenting the factor groups to a user or other entity. Thus, the user or other entity at the user device 102 can select a factor group that is to be used to authenticate with the resource 130.

A user or other entity may select a particular factor group based upon various considerations. Alternatively, the authentication application 108 can select a factor group based upon various considerations. The considerations can include, for example, privacy concerns, knowledge, device capabilities, location, combinations thereof, or the like. The user device 102 can obtain, via input and/or via execution of the authentication application 108 (e.g., by applying preferences and/or settings or the like), selection or choice of a factor group ("factor choice") and/or responses to the authentication factors included in the chosen group ("responses"). The user device 102 can generate data input 138 including the factor choice and responses, and transmit the data input 138 to the authentication service 110. It should be understood that in some embodiments, the user device 102 passes the data input 138 to the resource 130, and the resource 130 forwards the data input 138 or other data representing the data input 138 to the authentication service 110.

The authentication service 110 can compare the factor choice and responses to the user data 124 and/or other data 128 stored at the data store 116 to authenticate the requestor. Thus, the authentication service 110 can determine if the responses provided in the data input 138 successfully authenticate the user or not. Based upon the result of this determination, the authentication service 110 can generate an authentication result 140 and pass the authentication result 140 to the resource 130.

As such, some embodiments of the concepts and technologies described herein allow a requestor to be authenticated with the resource 130 without the resource 130 applying a security policy of its own. Thus, it can be appreciated that the authentication service 110 can function as a service that authenticates users or other entities and therefore can be used to substitute, complement, or replace security policies for users or callers. It should be understood that this example is illustrative and therefore should not be construed as being limiting in any way. Additional aspects of the concepts and technologies described herein for providing scored factor-based authentication will be illustrated and described in additional detail below.

FIG. 1 illustrates one user device 102, one network 104, one server computer 112, one data store 116, two authentication data sources 118, and one resource 130. It should be understood, however, that various implementations of the operating environment 100 include zero, one, or more than one user device 102, zero, one, or more than one network 104, zero, one, or more than one server computer 112, zero, one, or more than one data store 116, zero, one, or more than one authentication data sources 118, and/or zero, one, or more than one resource 130. As such, the illustrated embodiment should be understood as being illustrative, and should not be construed as being limiting in any way.

Figure 2:
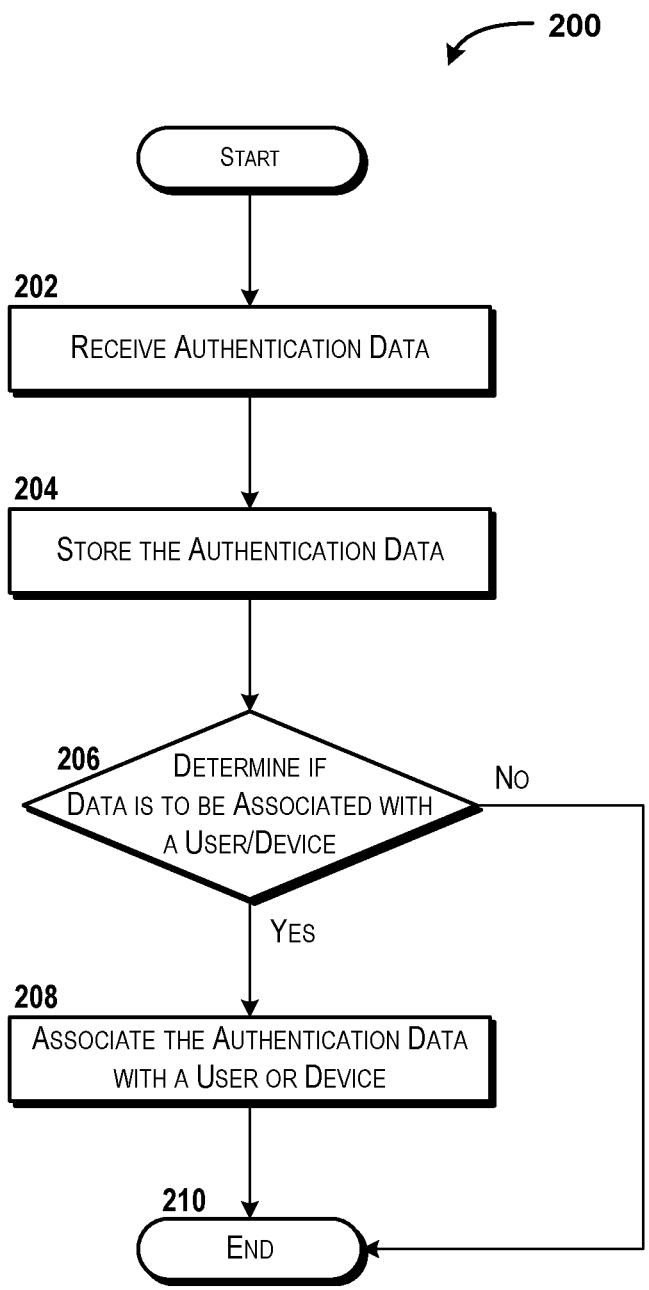
FIG. 2 is a flow diagram showing aspects of a method for obtaining and storing authentication data, according to an illustrative embodiment.

Turning now to FIG. 2, aspects of a method 200 for obtaining and storing authentication data will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as, for example, the user device 102, the server computer 112, and/or a computing system associated with the resource 130 to perform one or more operations and/or causing the processor to direct other components of the computing system or device to perform one or more of the operations.

For purposes of illustrating and describing the concepts of the present disclosure, the methods disclosed herein are described as being performed by the server computer 112 via execution of one or more software modules such as, for example, the authentication service 110. It should be understood that additional and/or alternative devices and/or network nodes can provide the functionality described herein via execution of one or more modules, applications, and/or other software including, but not limited to, the authentication service 110. Thus, the illustrated embodiments are illustrative, and should not be viewed as being limiting in any way.

The method 200 begins at operation 202. In operation 202, the server computer 112 receives authentication data 114. In some embodiments, the server computer 112 can receive the authentication data 114 from one or more authentication data sources such as, for example, the authentication data sources 118 shown in FIG. 1. The authentication data sources 118 can include various devices configured to generate and/or provide the authentication data 114 to the server computer 112. For example, as noted above, the authentication data sources 118 can include databases and/or other storage devices that can store risks, risk factors, formulae for determining authentication scores and/or variables used to determine authentication scores, transaction identifiers and/or transaction definitions, user information and/or user identifiers, combinations thereof, or the like.

From operation 202, the method 200 proceeds to operation 204. In operation 204, the server computer 112 stores the authentication data 114. In some embodiments, the server computer 112 stores the authentication data 114 at a local data storage device such as a memory, hard drive, or other data storage device associated with the server computer 112. In some other embodiments, the server computer 112 stores the authentication data 114 at a remote data storage device such as a server, a remote memory, a remote hard drive, a remote database, a remote data store, or other data storage devices remote from the server computer 112. In one contemplated example, the server computer 112 can be configured to store the authentication data 114 at the data store 116. It should be understood that this example is illustrative and therefore should not be construed as being limiting in any way.

From operation 204, the method 200 proceeds to operation 206. In operation 206, the server computer 112 can determine if the authentication data 114 received in operation 202 is to be associated with a user or device. For example, if the server computer 112 receives the authentication data 114 from the user device 102 in operation 202, the server computer 112 can determine, in operation 206, if the authentication data 114 received in operation 202 is to be associated with the user device 102 and/or a user of the user device 102. As such, the server computer 112 can be configured to obtain and/or receive authentication data 114 and associate that data with a particular device or user for various purposes as will be more clearly understood with reference to the description below. It should be understood that these examples are illustrative and therefore should not be construed as being limiting in any way.

If the server computer 112 determines, in operation 206, that the authentication data 114 received in operation 202 is to be associated with a user or device, the method 200 can proceed to operation 208. If the server computer 112 determines, in operation 206, that the authentication data 114 received in operation 202 is not to be associated with a user or device, the method 200 can proceed to operation 210.

In operation 208, the server computer 112 can associate the authentication data 114 received in operation 202 with a user or device. Thus, for example, if the authentication data 114 received in operation 202 includes biometric data such as fingerprint data, iris scan data, voiceprint data, DNA data, or the like, the server computer 112 can store the authentication data 114 with data identifying the user or device with which the data is associated. It can be appreciated that the security and/or accuracy of the association operation illustrated in operation 208 may include various operations and/or suboperations to ensure that the data is associated with an appropriate and/or correct entity, user, device, or the like. For example, the server computer 112 may use additional authentication methods such as verifying IP addresses based upon known billing addresses, verifying passwords, userIDs, combinations thereof, or the like. It should be understood that these examples are illustrative and therefore should not be construed as being limiting in any way.

From operation 208, the method 200 proceeds to operation 210. As noted above, the method 200 also can proceed to operation 210 from operation 206. The method 200 can end at operation 210. It should be understood that the method 200 may be repeated any number of times to generate and/or store the authentication data 114 such as the authentication data 114 illustrated in FIG. 1.

While not illustrated in FIG. 2, it also should be understood that the server computer 112 can obtain authentication data 114 that is not associated with a user or device. For example, the server computer 112 can obtain authentication data 114 from various authentication data sources 118 for various purposes and/or to be used in association with various users. For example, the authentication data obtained in operation 202 may correspond, for example, to data identifying and/or defining authentication factors, transactions and/or transaction types, risks or risk factors, formulae for determining scores, combinations thereof, or the like. As such, it can be appreciated that operations 206 and/or 208 may be omitted in some embodiments and/or may be replaced with additional and/or alternative operations.

Figure 3:
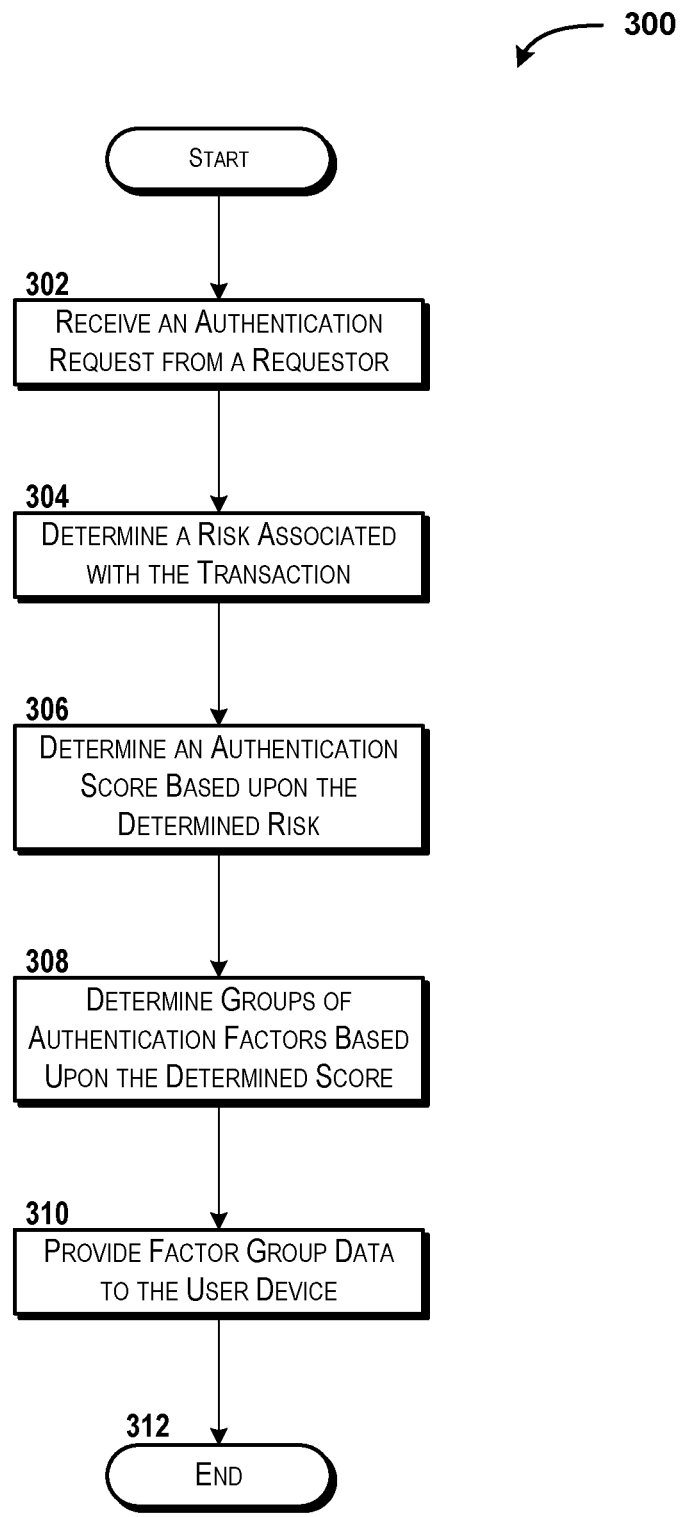
FIG. 3 is a flow diagram showing aspects of a method for identifying and providing authentication factor groups to a requestor, according to an illustrative embodiment.

Turning now to FIG. 3, aspects of a method 300 for identifying and providing authentication factor groups to a requestor will be described in detail, according to an illustrative embodiment. The method 300 begins at operation 302. In operation 302, the server computer 112 receives an authentication request 134 from a requestor. As explained above in detail with reference to FIG. 1, the authentication request 134 can be received from a resource 130 such as a website, an application, a computer, or the like. In some other embodiments, the authentication request 134 can be received from a device or system such as, for example, the user device 102 illustrated in FIG. 1. The authentication request 134 can be received from various sources, and as such, it should be understood that these examples are illustrative and should not be construed as being limiting in any way.

As explained above with reference to FIG. 1, the authentication request 134 received in operation 302 can include transaction information that identifies a transaction occurring at or in association with the requestor. The transaction information can include, for example, a transaction definition, a transaction type, location information, information describing or defining the transaction and/or parameters thereof (e.g., amounts involved parties or entities, locations of involved entities, types of connections and/or networks used in the transactions, transaction histories, combinations thereof, or the like).

The authentication request 134 also can include information identifying a user or device involved in the transaction, as explained above. In the illustrated embodiment, the authentication request 134 at least identifies a transaction occurring at the resource 130 or in association with the resource 130. Because the authentication request 134 can include additional information, it should be understood that this example are illustrative and should not be construed as being limiting in any way.

From operation 302, the method 300 proceeds to operation 304. In operation 304, the server computer 112 determines a risk associated with the transaction identified by the authentication request 134. According to various embodiments, as explained above in detail with reference to FIG. 1, the authentication service 110 can analyze the authentication request 134 and the transaction identified by the authentication request 134, and analyze the authentication data 114 to determine the risk associated with the transaction. As explained above, the authentication data 114 can include risk data 120 that can identify transactions and/or types of transactions. The risk data 120 also can identify risks associated with various transactions and/or types of transactions.

The risk determined in operation 304 can, but does not necessarily, assign an objective value to a risk of authenticating an unauthorized entity for the transaction indicated by the authentication request 134. As noted above, a risk in authenticating an unauthorized entity for obtaining sports scores or weather information may be relatively low compared to another risk in authenticating an unauthorized entity for executing a trade to purchase or sell securities, executing a balance transfer between accounts, or the like. It should be understood that these examples are illustrative and therefore should not be construed as being limiting in any way.

According to various embodiments, the risk determined in operation 304 can be defined in a number of ways. In some embodiments, the risk can be defined as a numerical risk value. Thus, for example, risk can be defined as a number (or portion of a number) on a numerical scale. In one contemplated example, the risk can be defined as a numerical value to two decimal places on a scale between zero and ten or one and ten, wherein ten is the riskiest and zero is the least risky. In another contemplated example, the risk can be defined as a numerical scale of whole numbers between one and five, zero and ten, one and ten, one and one hundred, or the like. In still other embodiments, the risk can be defined as a less subjective measure such as very low, low, medium-low, medium, medium-high, high, very high, or the like. Because almost endless possibilities exist for grading or rating risk according to various measures and/or scales, it should be understood that these examples are illustrative and should not be construed as being limiting in any way.

From operation 304, the method 300 proceeds to operation 306. In operation 306, the server computer 112 determines an authentication score based upon the risk determined in operation 304. As explained above, authentication data 114 can include data that assigns authentication scores based upon determined risk. Thus, for example, the authentication data can include a rule that correlates an authentication score with a risk such as, for example, a linear multiplier. Thus, in this embodiment, a risk of five on a scale of one to ten may be multiplied by a risk variable or multiplier such as 1.5, or the like, to arrive at an authentication score of 7.5. It should be understood that this example is illustrative and therefore should not be construed as being limiting in any way.

In operation 306, the server computer can analyze the authentication data 114 and the transaction type and/or risk determined in operations 302-304 to determine the authentication score to be enforced for the transaction. The authentication score can be based, at least in part, upon the risk data 120, the factor data 122, the score data 126, and an identification of the transaction or transaction type. Because the authentication score can be determined based upon additional and/or alternative types of information, it should be understood that this example is illustrative and should not be construed as being limiting in any way.

From operation 306, the method 300 proceeds to operation 308. In operation 308, the server computer 112 can determine two or more groups of authentication factors based upon the determined score. As explained above, the groups of authentication factors can include at least two groups of authentication factors that, if successfully answered or satisfied by a user, will provide nonrepudiation of the authentication. At least two groups of factors are generated, in some embodiments, to allow a user or other entity to select how the required authentication score will be satisfied while still imposing or enforcing the required level of security.

As explained above, the groups of authentication factors can be determined based upon assigned strengths of the authentication factors, which may be determined based at least partially upon the authentication data 114; a determined strength of the connection used during the transaction, which may be determined based upon the transaction information included in the authentication request 134; and aspect strengths of the authentication factors, which may be determined based upon the authentication data 114. Thus, if the authentication score to be enforced is 5.0, for example, the server computer 112 can generate at least two groups of authentication factors that would, in respective combinations as defined by the authentication groups, satisfy the authentication score.

The two or more groups of authentication factors can include a variety of authentication factors, if desired, to ensure that the requestor has the opportunity to respond. For example, if one factor group requires a fingerprint, the other factor group may require a different authentication factor to ensure that a user or other entity does not have to provide a fingerprint to authenticate. Thus, some embodiments of the concepts and technologies described herein provide consistent security and/or enforcement of authentication scores while allowing users or other entities to enjoy flexibility. It should be understood that this example is illustrative and therefore should not be construed as being limiting in any way.

From operation 308, the method 300 proceeds to operation 310. In operation 310, the server computer 112 provides factor group data 136 to the requestor or another entity. In some embodiments, for example, a user device 102 may generate the authentication request 134, and the server computer 112 may provide the factor group data 136 to the resource 130. In some other embodiments, the resource 130 may generate the authentication request 134, and the server computer 112 may provide the factor group data 136 to the user device 102. In other embodiments, as described above with reference to FIG. 1, the requestor may receive the factor group data 136. Because the factor group data 136 can be provided to other entities such as entities that generate user interface data, or the like, it should be understood that these examples are illustrative and therefore should not be construed as being limiting in any way.

From operation 310, the method 300 proceeds to operation 312. The method 300 can end at operation 312. Although not shown in FIG. 3, it should be understood that the requestor or other party can generate a user interface for presenting the factor groups to a user or other entity and/or can forward to the data to a device so that the device can generate a user interface for obtaining selection of the factor group. Because additional and/or alternative operations can be executed by the server computer 112 to present the choices at a device and/or for a user or other entity, it should be understood that these examples are illustrative and should not be construed as being limiting in any way.

Figure 4:
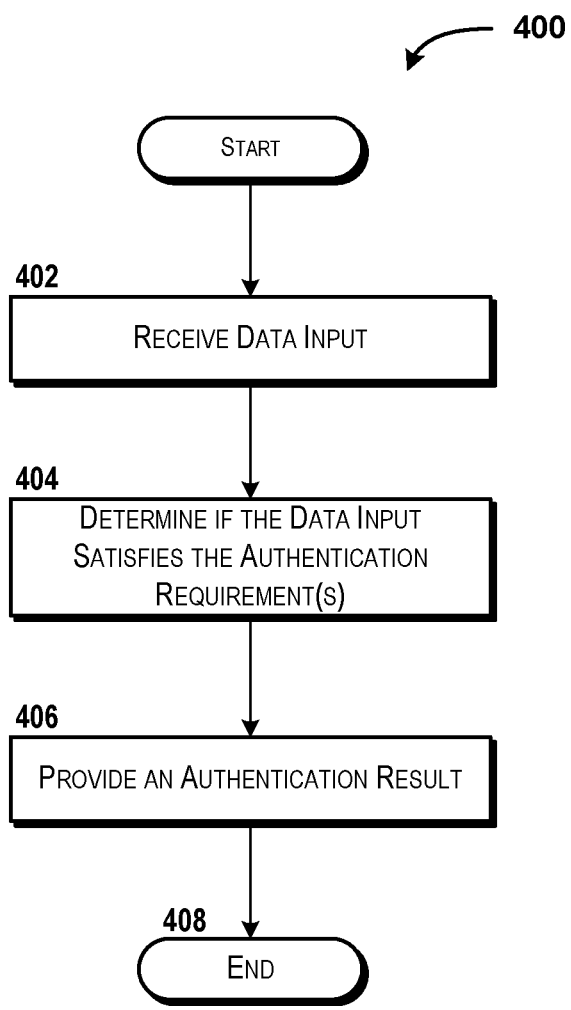
FIG. 4 is a flow diagram showing aspects of a method for authenticating a user device using an authentication service, according to an illustrative embodiment.

Turning now to FIG. 4, aspects of a method 400 for authenticating a user device using an authentication service will be described in detail, according to an illustrative embodiment. The method 400 begins at operation 402. In operation 402, the server computer 112 receives data input, for example the data input 138 shown in FIG. 1. The data input 138 received in operation 402 can identify a choice of a factor group by a device, user, or other entity. The data input 138 received in operation 402 additionally, or alternatively, can include responses for the authentication factors included in the factor group. Thus, for example, the data input 138 received in operation 402 may identify a factor group such as fingerprint-password-token and/or responses for these authentication factors such as, for example, fingerprint data, a password, and a token.

It should be understood that the data input 138 received in operation 402 can be generated at a resource such as the resource 130 shown in FIG. 1, at a user device such as the user device 102 shown in FIG. 1, and/or at other devices, entities, or the like. Thus, operation 402 can include receiving the data input 138 directly from the device that generated the data input 138 and/or can include receiving the data input 138 forwarded from a device that did not generate the data input 138. It should be understood that these examples are illustrative and therefore should not be construed as being limiting in any way.

From operation 402, the method 400 proceeds to operation 404. In operation 404, the server computer 112 can determine if the data input 138 received in operation 402 satisfies one or more authentication requirements. The authentication requirements can include a minimum authentication score that is to be met by the data input 138. Thus, for example, a factor group may include a number of authentication factors that, if accurately responded to and/or satisfied, may exceed a required authentication score. Thus, operation 404 can include determining if the data input 138 satisfied a minimum imposed authentication score.

Operation 404 also can include, for example, determining if the data included in the data input 138 is accurate and/or correct. If the data input 138 includes a voiceprint and a date of birth, for example, operation 404 can include determining if the voiceprint matches a known baseline voice signature and/or if the date of birth matches a known date of birth. It should be understood that these examples are illustrative and therefore should not be construed as being limiting in any way.

From operation 404, the method 400 proceeds to operation 406. In operation 406, the server computer 112 can provide an authentication result 140. In some embodiments, the authentication result 140 can be provided to a requestor that requested authentication. For example, an entity that requests authentication via an authentication request 134 such as that received in operation 202 may also receive the authentication result 140 in operation 406, though this is not necessarily the case. In some other embodiments, an entity that generates an authentication request 134 may not receive the authentication result 140. Thus, it should be understood that the authentication result 140 can be provided to one or more entities including, or excluding, the entity that generated the authentication request 134.

In one contemplated embodiment, the resource 130 generates an authentication request 134, and the resource 130 receives the authentication result 140. Thus, the resource 130 may know whether to allow the transaction that prompted the authentication request 134 to continue or if the transaction is to be blocked or terminated. It should be understood that this example is illustrative and therefore should not be construed as being limiting in any way.

From operation 406, the method 400 proceeds to operation 408. The method 400 ends at operation 408.

Figure 5A:
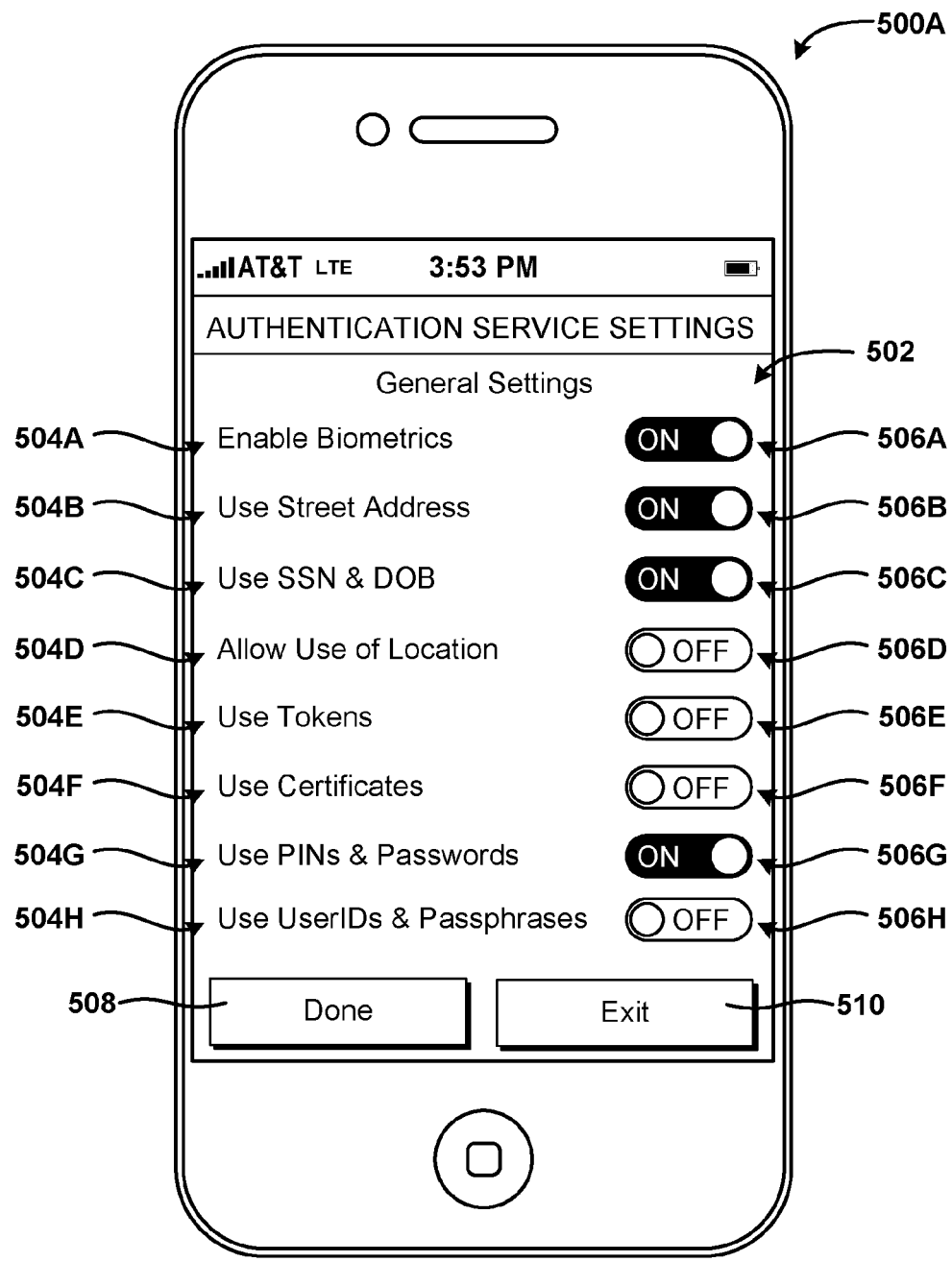
FIGS. 5A-5D are user interface diagrams illustrating user interfaces for configuring and using an authentication service, according to some illustrative embodiments.

FIGS. 5A-5D are user interface ("UI") diagrams showing aspects of UIs for interacting with, configuring, and/or providing functionality associated with an authentication service, according to some illustrative embodiments of the concepts and technologies described herein. FIG. 5A shows an illustrative screen display 500A generated by a device such as the user device 102. According to various embodiments, the user device 102 can generate the screen display 500A and/or other screen displays in conjunction with execution of the authentication application 108 and/or interactions with the authentication service 110. It should be appreciated that the UI diagram illustrated in FIG. 5A is illustrative of one contemplated example of the UIs and therefore should not be construed as being limited in any way.

The screen display 500A can include various menus and/or menu options (not shown in FIG. 5A). The screen display 500A also can include an authentication service options display 502. The authentication service options display 502 can be interacted with by a user or other entity to configure the authentication application 108 executed by the user device 102 and/or to configure the authentication service 110 hosted by the server computer 112.

In the embodiment shown in FIG. 5A, the authentication service options display 502 includes a number of user interfaces corresponding to various configurable and/or settable options, which are described in additional detail below. Because configurations, settings, or options associated with the authentication application 108 and/or the authentication service 110 can be configured, set, or selected in a variety of ways, it should be understood that the illustrated example is illustrative. As such, the embodiment shown in FIG. 5A should not be construed as being limiting in any way.

In the illustrated embodiment, the authentication service options display 502 includes a number of authentication service settings 504A-H (hereinafter collectively and/or generically referred to as "authentication service settings 504"). The authentication service settings 504 can be interacted with by a user or other entity to configure and/or set various configurations or settings associated with the authentication application 108 and/or the authentication service 110. The illustrated example authentication service settings 504 are described below. Because additional and/or alternative authentication service settings 504 can be displayed and/or interacted with via the authentication service options display 502, it should be understood that the example authentication service settings 504 shown in FIG. 5A are illustrative and should not be construed as being limiting in any way.

The authentication service setting 504A can be used to enable or disable the use of biometric information such as fingerprint information, voiceprint recognition, iris scanning, facial recognition, DNA information, or the like. In the illustrated embodiment, a user can select or de-select the UI control 506A to activate or deactivate the use of biometric information. It can be appreciated from the description herein that the selection or de-selection of the UI control 506A can allow or disallow the use of biometric information as one of the authentication factors relied upon in generating the authentication factor groups described herein. Users may activate or deactivate biometric information usage to heighten the nonrepudiation of authentication and/or to address perceived privacy and/or security concerns. In the illustrated embodiment, the UI control 506A is illustrated as being activated, which can indicate that a user or other entity has indicated that biometric information is allowed to be used as an authentication factor and/or for other purposes. It should be understood that this example is illustrative and therefore should not be construed as being limiting in any way.

The authentication service setting 504B can be used to enable or disable the use of a street address or street address information as one of the authentication factors described herein. As explained above, "something known" by a real user may be a type of information having a lowest level of nonrepudiation due to the ease with which information like a street address may be discovered by other entities. Thus, a user or other entity may elect to disable the use of a street address to increase a level of security. On the other hand, a street address may be easy for a user or other entity to remember and therefore may be enabled to ease the authentication using the authentication service 110. Selection or de-selection of the UI control 506B can be used to allow or disallow the use of street address information. In the illustrated embodiment, the UI control 506B is illustrated as being activated, which can indicate that a user or other entity has indicated that street address information is allowed to be used as an authentication factor and/or for other purposes. It should be understood that this example is illustrative and therefore should not be construed as being limiting in any way.

The authentication service setting 504C can be used to enable or disable the use of personal information such as a social security number or a date of birth as one of the authentication factors described herein. As explained above, "something known" by a real user may be a type of information having a lowest level of nonrepudiation due to the ease with which some types of information known by users may be discovered by other entities. A date of birth or social security number, however, differs from a street address in that a social security number or date of birth generally are not as easy to discover as a street address. Thus, a user or other entity may elect to allow the use of a social security number or date of birth (or both) due to a perception that this will not negatively impact security, and because this information generally is well known by users and therefore easy to remember. Selection or de-selection of the UI control 506C can be used to allow or disallow the use of social security number and/or date of birth information, if desired. In the illustrated embodiment, the UI control 506C is illustrated as being activated, which can indicate that a user or other entity has indicated that a social security number and/or date of birth may be used as authentication factors and/or for other purposes. It should be understood that this example is illustrative and therefore should not be construed as being limiting in any way.

The authentication service setting 504D can be used to enable or disable the use of location with the authentication application 108 and/or the authentication service 110. As explained above, location information may be used to determine a risk associated with a transaction and/or to determine an authentication score to be enforced for the transaction. Some users, however, may wish to limit the use of location information for perceived security and/or privacy concerns. Thus, the authentication service setting 504D can be interacted with by a user or other entity to enable or disable the use of the location. Selection or deselection of the authentication service setting 504D can cause the authentication application 108 and/or the authentication service 110 to enable or disable the detection and/or use of location-based information when providing functionality associated with the authentication service 110. Thus, selection of the UI control 506D can cause the user device 102 to activate and/or deactivate usage of location data by the authentication application 108 and/or the authentication service 110. In the illustrated embodiment, the UI control 506D is illustrated as being deactivated, which can indicate that a user or other entity has disabled the use of location information. It should be understood that this example is illustrative and therefore should not be construed as being limiting in any way.

The authentication service setting 504E can be used to turn on or turn off the use of tokens by the authentication application 108 and/or the authentication service 110. While tokens may be used to provide a possession-based authentication factor, which may more reliable from a nonrepudiation standpoint than "something known" types of information, some users may wish to disable the use of tokens for various reasons. For example, if the device storing the token is stolen, the token may be accessible or usable by the thief. Thus, selection or de-selection of the UI control 506E can cause the user device 102 to activate and/or deactivate the use of tokens by the authentication application 108 and/or the authentication service 110. In the illustrated embodiment, the UI control 506E is illustrated as being deactivated, which can indicate that a user or other entity has disabled the use of tokens. It should be understood that this example is illustrative and therefore should not be construed as being limiting in any way.

The authentication service setting 504F can be used to turn on or turn off the use of certificates by the authentication application 108 and/or the authentication service 110. While certificates such as PKI certificates or the like may be used to provide a relatively high level of security, some users may wish to disable the use of certificates for various reasons. For example, if a certificate used by a user is expired or compromised, a user or other entity may wish to deactivate the use of certificates until a new or updated certificate can be installed or otherwise accessed. Thus, selection or de-selection of the UI control 506F can cause the user device 102 to activate and/or deactivate the use of certificates by the authentication application 108 and/or the authentication service 110. In the illustrated embodiment, the UI control 506F is illustrated as being deactivated, which can indicate that a user or other entity has disabled the use of certificates. It should be understood that this example is illustrative and therefore should not be construed as being limiting in any way.

The authentication service setting 504G can be used to enable or disable the use of personal identification numbers (PINS) and/or passwords as authentication factors. A user or other entity may elect to disable the use of PINS and/or passwords to increase a level of security. On the other hand, PINS and passwords may be easily remembered and rarely shared and/or accessible and therefore may be relatively reliable, easy to remember, and/or relatively safe from inadvertent disclosure. Selection or de-selection of the UI control 506G can be used to allow or disallow the use of PINS or passwords by the authentication application 108 and/or the authentication service 110. In the illustrated embodiment, the UI control 506G is illustrated as being activated, which can indicate that a user or other entity has indicated that PINS and/or passwords are to be allowed for use as authentication factors. It should be understood that this example is illustrative and therefore should not be construed as being limiting in any way.

The authentication service setting 504H can be used to enable or disable the use of userIDs and/or passphrases as authentication factors. A user or other entity may elect to disable the use of userIDs and/or passphrases to increase a level of security, while some other users or other entities may wish to allow the use of userIDs and/or passphrases to ease the use of the authentication service 110. Selection or de-selection of the UI control 506H can be used to allow or disallow the use of userIDs and/or passphrases by the authentication service 110. In the illustrated embodiment, the UI control 506H is illustrated as being deactivated, which can indicate that a user or other entity has disabled the use of userIDs and/or passphrases as authentication factors. It should be understood that this example is illustrative and therefore should not be construed as being limiting in any way.

The authentication service options display 502 also can display a UI control 508 for indicating that configuration of the authentication application 108 and/or the authentication service 110 is complete and a UI control 510 for indicating that a user or other entity wishes to exit the configuration screen without saving any changes made. Because other UI controls can be displayed in addition to, or instead of the illustrated examples, it should be understood that the illustrated embodiment shown in FIG. 5A is illustrative, and therefore should not be construed as being limiting in any way.

It can be appreciated that selection of the UI control 508 can cause the user device 102 to pass one or more preferences to the authentication application 108 and/or to cause the user device 102 to transmit one or more preferences to the authentication service 110, if desired. The settings or preferences configured by way of the authentication service options display 502 (or otherwise configured or set as described herein) can be stored as or with the authentication data 114, though this is not necessarily the case. It should be understood that this example is illustrative and should not be construed as being limiting in any way.

Figure 5B:
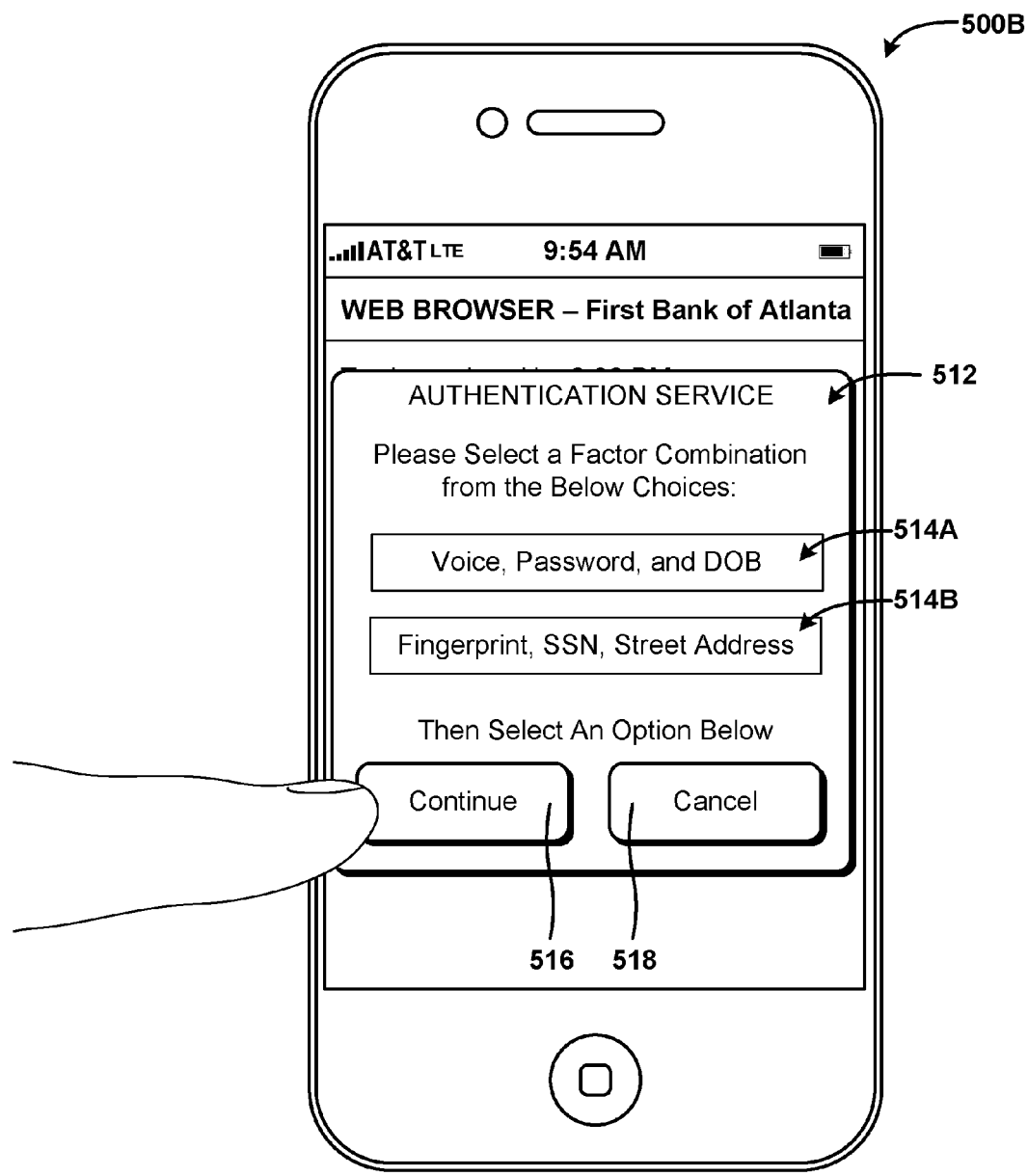

Referring now to FIG. 5B, a UI diagram showing additional aspects of the concepts and technologies disclosed herein for configuring and/or interacting with an authentication service are described in detail. In particular, FIG. 5B shows an illustrative screen display 500B generated by a device such as the user device 102. It should be appreciated that the UI diagram illustrated in FIG. 5B is illustrative of one contemplated example of a UI and therefore should not be construed as being limited in any way. As shown in FIG. 5B, the screen display 500B can be presented on a mobile computing device such as a smartphone, if desired. It should be understood that this example is illustrative, and should not be construed as being limiting in any way.

The screen display 500B can be displayed by the user device 102, for example, in response to initiation of a transaction that is to include or require authentication with the authentication service 110. The screen display 500B may be generated by the authentication application 108 in some embodiments, though this is not necessarily the case. In the illustrated embodiment, the screen display 500B includes an authentication factor display 512. The authentication factor display 512 can be displayed at the user device 102 to allow a user or other entity to select a factor group that is to be used during authentication as described herein. It should be understood that the illustrated embodiment is illustrative of one contemplated authentication factor display 512 and therefore should not be construed as being limiting in any way.

The authentication factor display 512 can present one or more factor group options for selection by a user or other entity. Thus, it can be appreciated from the description of FIG. 1 that the authentication factor display 512 can be generated based upon the factor group data 136 described above, if desired. In the illustrated embodiment, the authentication factor display 512 includes two UI controls 514A-B for selecting one of two authentication factor groups. Because it should be clear from the above description of the concepts and technologies described herein that two or more factor groups can be presented, it should be understood that the illustrated embodiment is merely illustrated of a single contemplated example for purposes of illustrating and describing the concepts and technologies described herein.

The authentication factor display 512 also can include a UI control 516 for selecting an option to continue with an authentication process. Selection of the UI control 516 can prompt the user device 102 to generate another display or screen for entering the authentication factor responses that correspond to the authentication factors displayed on the UI controls 514A-B. Because other operations can be executed by the user device 102 or other devices in response to selection of the UI control 516, it should be understood that this example is illustrative and therefore should not be construed as being limiting in any way.

The authentication factor display 512 also can include a UI control 518 for indicating that a user or other entity wishes to cancel the authentication request that prompted display of the authentication factor display 512. Because other UI controls can be displayed in addition to, or instead of the illustrated examples, it should be understood that the illustrated embodiment shown in FIG. 5B is illustrative and should not be construed as being limiting in any way.

Figure 5C:
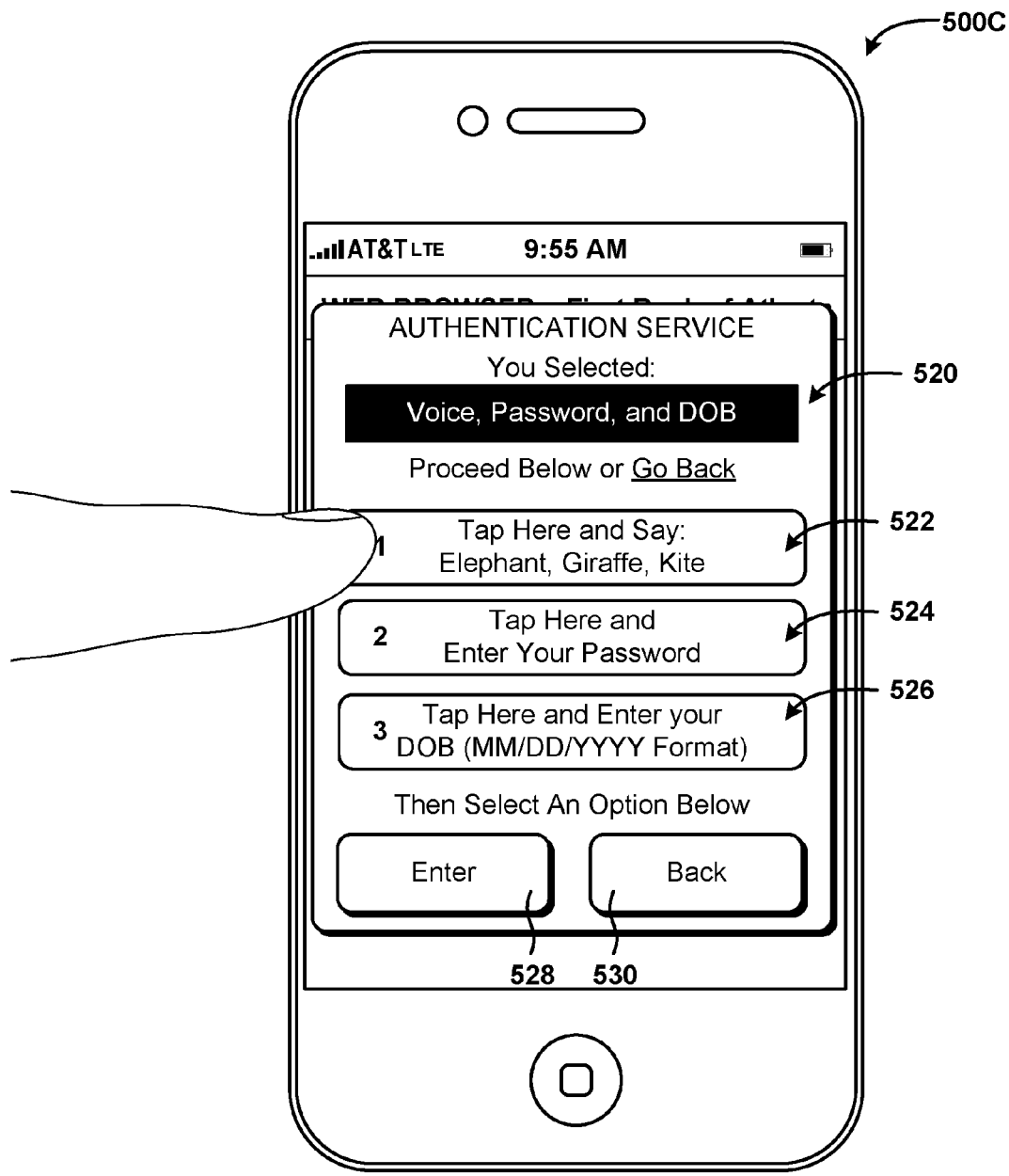

Turning now to FIG. 5C, a UI diagram showing additional aspects of the concepts and technologies disclosed herein for interacting with and/or providing functionality associated with an authentication service are described in detail. In particular, FIG. 5C shows an illustrative screen display 500C generated by and/or presented at a device such as the user device 102 via execution and/or interaction with an authentication application 108 and/or via interactions with an authentication service 110. It should be appreciated that the UI diagram illustrated in FIG. 5C is illustrative of one contemplated example of a UI that can be generated by the user device 102 and therefore should not be construed as being limited in any way. As shown in FIG. 5C, the screen display 500C can be presented on a mobile computing device such as a smartphone, if desired. It should be understood that this example is illustrative, and should not be construed as being limiting in any way.

The screen display 500C can be displayed by the user device 102, for example, in response to selection of the UI control 516 illustrated in FIG. 5B. Because the screen display 500C can be presented at additional and/or alternative times, it should be understood that this example is illustrative and therefore should not be construed as being limiting in any way. In the illustrated embodiment, the screen display 500C includes an authentication screen 520. The authentication screen 520 can be displayed at the user device 102 to enable a user or other entity to authenticate as described herein. It should be understood that the illustrated embodiment is illustrative of one contemplated authentication screen 520 and therefore should not be construed as being limiting in any way.

The authentication screen 520 can present an indication of a selected factor group option, though this is not necessarily the case. The authentication screen 520 also can include a UI control 522 that, when selected, causes the user device 102 to record audio. In the illustrated embodiment, the UI control 522 informs a user or other entity to select the UI control 522 to commence recording of audio, and then to say three words. The audio recording of a user or other entity saying the words displayed in the UI control 522 can be compared to a voice signature and used for voiceprint identification. Of course, the illustrated words are purely illustrative, as a user or other entity may be asked to say various phrases, to make a single note or sound, and/or to otherwise generate voice signals for use in voiceprint identification. Thus, it should be understood that the illustrated embodiment is illustrative and should not be construed as being limiting in any way.

The authentication screen 520 also can include a UI control 524 that, when selected, causes the user device 102 to display a keyboard or otherwise allow entry of data. In the illustrated embodiment, the UI control 524 informs a user or other entity to select the UI control 524 and then to enter a password. It should be understood that the UI control 524 can display and/or allow the input of various types of information, selection of a token or certificate, the taking of a photograph of a face, iris, fingerprint, or the like, and/or to enter any other authentication factor response as described herein. As such, it should be understood that the illustrated embodiment of the UI control 524 is illustrative and should not be construed as being limiting in any way.

The authentication screen 520 also can include a UI control 526 that, when selected, causes the user device 102 to display a keyboard or otherwise allow entry of data. In the illustrated embodiment, the UI control 526 informs a user or other entity to select the UI control 526 and then to enter a date of birth. It should be understood that the UI control 526 can display and/or allow the input of various types of information as noted above with respect to the UI control 524. As such, it should be understood that the illustrated embodiment of the UI control 526 is illustrative and should not be construed as being limiting in any way.

The authentication screen 520 also can include a UI control 528 for selecting an option to continue with an authentication process. Selection of the UI control 528 can prompt the user device 102 to submit the data input 138, which can include the factor group selection and the responses entered by way of the UI controls 522, 524, 526 to the authentication service 110, the resource 130, and/or other entities or devices. Because other operations can be executed by the user device 102 or other devices in response to selection of the UI control 528, it should be understood that this example is illustrative and therefore should not be construed as being limiting in any way.

The authentication screen 520 also can include a UI control 530 for indicating that a user or other entity wishes to cancel the authentication and return to a previous screen such as, for example, a display used to select a factor group. Thus, selection of the UI control 530 can cause the user device 102 to generate and display the screen display 500B illustrated and described above with reference to FIG. 5B. Because other UI controls can be displayed in addition to, or instead of the illustrated examples, it should be understood that the illustrated embodiment shown in FIG. 5C is illustrative and should not be construed as being limiting in any way.

Figure 5D:
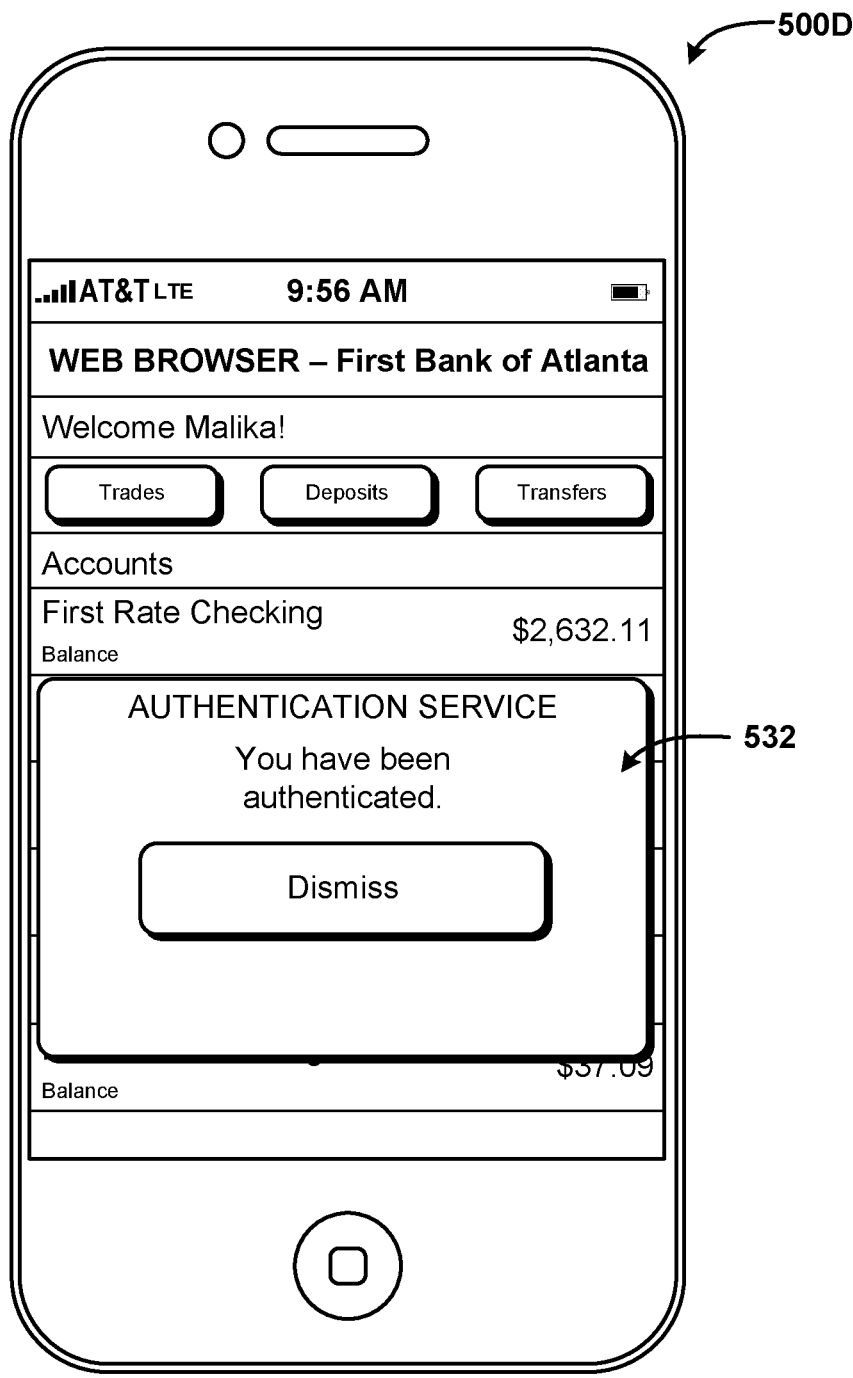

Turning now to FIG. 5D, a UI diagram showing additional aspects of the concepts and technologies disclosed herein for interacting with and/or providing functionality associated with an authentication service are described in detail. In particular, FIG. 5D shows an illustrative screen display 500D generated by and/or presented at a device such as the user device 102 via execution and/or interaction with an authentication application 108 and/or interactions with an authentication service 110. It should be appreciated that the UI diagram illustrated in FIG. 5D is illustrative of one contemplated example of a UI that can be generated by the user device 102 and therefore should not be construed as being limited in any way. As shown in FIG. 5D, the screen display 500D can be presented on a mobile computing device such as a smartphone, if desired. It should be understood that this example is illustrative, and should not be construed as being limiting in any way.

As shown in FIG. 5D, the screen display 500D can present an authentication result screen 532 for indicating an authentication result 140. As shown in the illustrated embodiment, the authentication result screen 532 can indicate to a user or other entity that the user or other entity has successfully authenticated using the authentication service 110. The authentication result screen 532 can include an option to dismiss the authentication result screen 532, if desired. It should be understood that this example is illustrative and therefore should not be construed as being limiting in any way.

Figure 6:
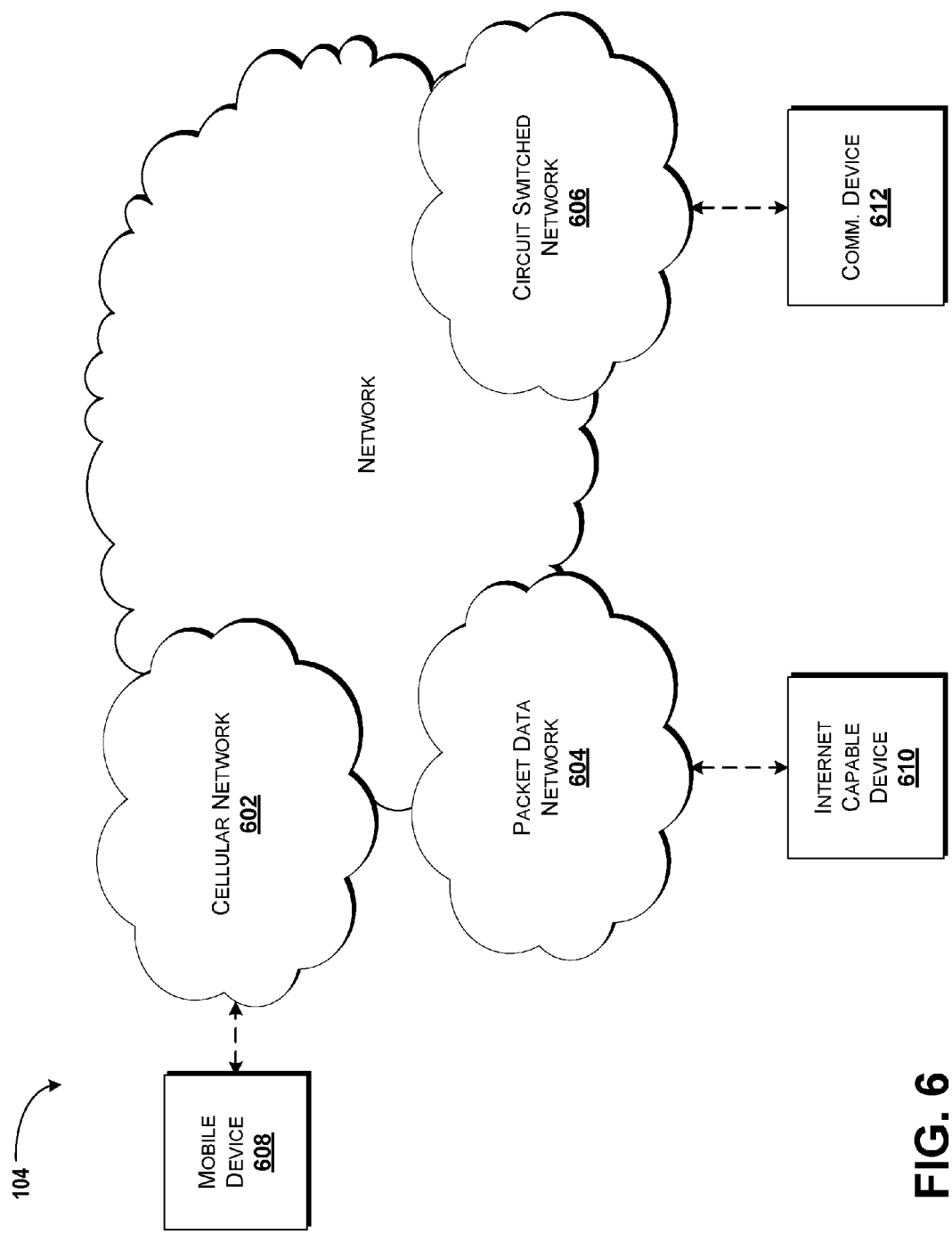
FIG. 6 schematically illustrates a network, according to an illustrative embodiment.

Turning now to FIG. 6, additional details of the network 104 are illustrated, according to an illustrative embodiment. The network 104 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G and 5G mobile communications standards as well as evolved and future mobile standards such as long term evolution ("LTE"), WiMAX, or the like.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 104 is used to refer broadly to any combination of the networks 602, 604, 606. It should be appreciated that substantially all of the functionality described with reference to the network 104 can be performed by the cellular network 602, the packet data network 604, and/or the circuit switched network 606, alone or in combination with other networks, network elements, and the like.

According to various implementations of the concepts and technologies described herein, the user device 102, the server computer 112, the authentication data sources 118, and/or the resource 130 can use or include any combination of the devices disclosed herein including, but not limited to, the mobile communications device 608, the Internet-capable device 610, and/or the communications device 612 to provide the functionality described herein.

Figure 7:
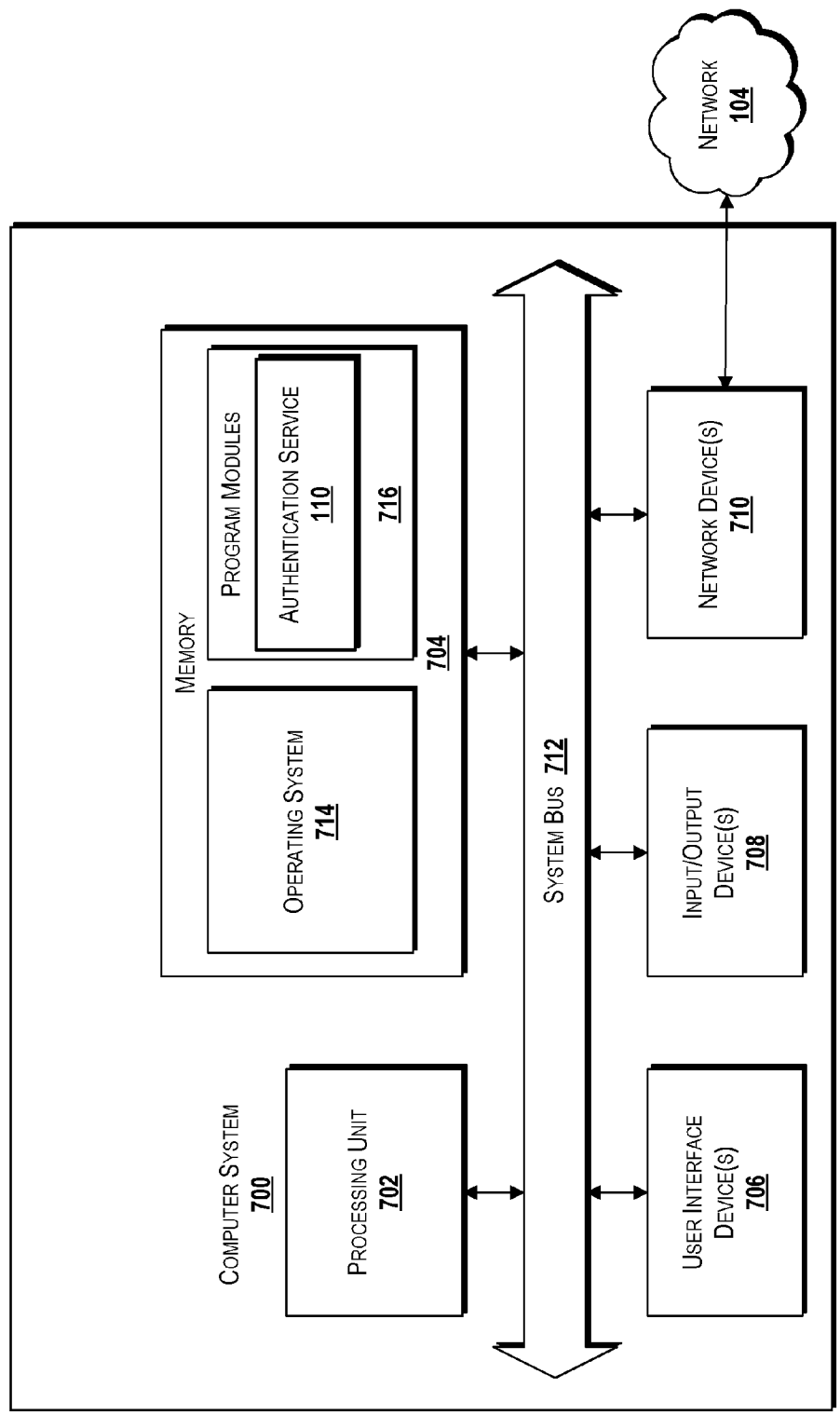
FIG. 7 is a block diagram illustrating an example computer system configured to provide an authentication service, according to some illustrative embodiments.

FIG. 7 is a block diagram illustrating a computer system 700 configured to provide the functionality described herein for providing scored factor-based authentication, in accordance with various embodiments of the concepts and technologies disclosed herein. For example, the computer system 700 can provide the functionality described herein with respect to the server computer 112, though this is not necessarily the case. In the illustrated embodiment, the computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 704 communicates with the processing unit 702 via the system bus 712. In some embodiments, the memory 704 is operatively connected to a memory controller (not shown) that enables communication with the processing unit 702 via the system bus 712. The memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 716 may include various software and/or program modules described herein. In some embodiments, for example, the program modules 716 include the authentication service 110, though this is not necessarily the case. This and/or other programs can be embodied in computer-readable media containing instructions that, when executed by the processing unit 702, perform one or more of the methods 200, 300, 400 described in detail above with respect to FIGS. 2-4. According to embodiments, the program modules 716 may be embodied in hardware, software, firmware, or any combination thereof. Although not shown in FIG. 7, it should be understood that the memory 704 also can be configured to store the authentication data 114, the request 132, the authentication request 134, the factor group data 136, the data input 138, and/or other data, if desired.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above are included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network, such as the network 104. Examples of the network devices 710 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 8:
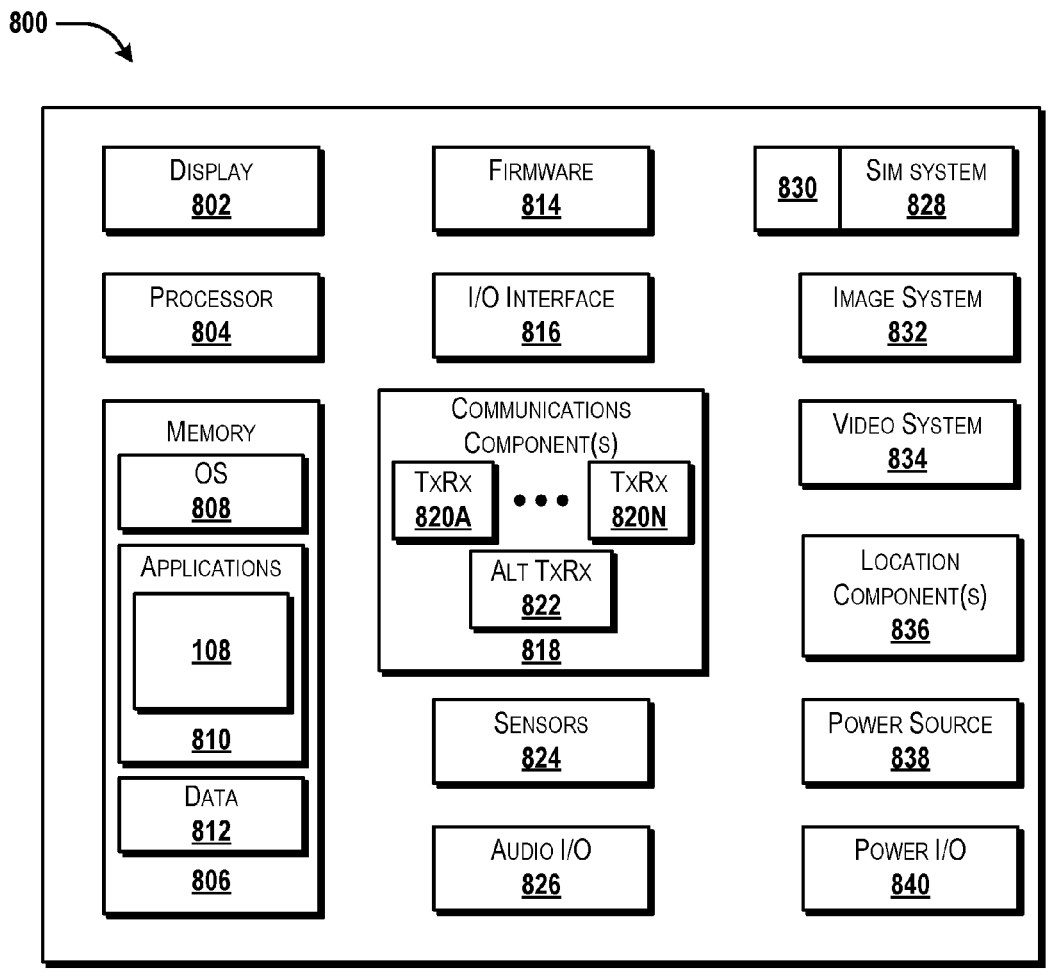
FIG. 8 is a block diagram illustrating an example mobile device configured to interact with an authentication service, according to some illustrative embodiments.

Turning now to FIG. 8, an illustrative mobile device 800 and components thereof will be described. In some embodiments, the user device 102 described above with reference to FIGS. 1-5D can be configured as and/or can have an architecture similar or identical to the mobile device 800 described herein in FIG. 8. It should be understood, however, that the user device 102 may or may not include the functionality described herein with reference to FIG. 8. While connections are not shown between the various components illustrated in FIG. 8, it should be understood that some, none, or all of the components illustrated in FIG. 8 can be configured to interact with one other to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display authentication information, authentication groups and/or group choices, various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 800 also can include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808, one or more applications 810 such as the application programs (not illustrated) and the authentication application 108, other computer-executable instructions stored in a memory 806, or the like. In some embodiments, the applications 810 also can include a UI application (not illustrated in FIG. 8).

The UI application can interface with the operating system 808, such as the operating system 106 shown in FIG. 1, to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in entering content, selecting authentication factor groups, responding to authentication challenges, answering/initiating calls, entering/deleting data, entering and setting user IDs and passwords for device access, configuring settings, manipulating address book content and/or settings, multimode interaction, interacting with other applications 810, and otherwise facilitating user interaction with the operating system 808, the applications 810, and/or other types or instances of data 812 that can be stored at the mobile device 800. The data 812 can include, for example, user information, authentication data 114, requests, and/or other applications or program modules. According to various embodiments, the data 812 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 810, the data 812, and/or portions thereof can be stored in the memory 806 and/or in a firmware 814, and can be executed by the processor 804. The firmware 814 also can store code for execution during device power up and power down operations. It can be appreciated that the firmware 814 can be stored in a volatile or non-volatile data storage device including, but not limited to, the memory 806 and/or a portion thereof.

The mobile device 800 also can include an input/output ("I/O") interface 816. The I/O interface 816 can be configured to support the input/output of data such as location information, asset information, user information, organization information, presence status information, user IDs, passwords, and application initiation (start-up) requests. In some embodiments, the I/O interface 816 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45 or RJ48) port, an RJ11 port, a proprietary port, combinations thereof, or the like. In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more networks such as the network 104 described herein. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments one or more of the transceivers of the communications component 818 may be configured to communicate using GSM, CDMAONE, CDMA2000, LTE, and various other 2G, 2.5G, 3G, 4G, 5G, and greater generation technology standards. Moreover, the communications component 818 may facilitate communications over various channel access methods (which may or may not be used by the aforementioned standards) including, but not limited to, TDMA, FDMA, W-CDMA, OFDM, SDMA, and the like.

In addition, the communications component 818 may facilitate data communications using GPRS, EDGE, the HSPA protocol family including HSDPA, EUL or otherwise termed HSDPA, HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, orientation sensors, noise sensors, proximity sensors, or the like. As such, it should be understood that the sensors 824 can include, but are not limited to, accelerometers, magnetometers, gyroscopes, infrared sensors, noise sensors, microphones, combinations thereof, or the like. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to an MMS message, email message, and sent to another mobile device. The video and/or photo content also can be shared with other devices via various types of data transfers via wired and/or wireless communication devices as described herein.

The mobile device 800 also can include one or more location components 836. The location components 836 can be configured to send and/or receive signals to determine a geographic location of the mobile device 800. According to various embodiments, the location components 836 can send and/or receive signals from global positioning system ("GPS") devices, assisted-GPS ("A-GPS") devices, WI-FI/WIMAX and/or cellular network triangulation data, combinations thereof, and the like. The location component 836 also can be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

Based on the foregoing, it should be appreciated that systems and methods for scored factor-based authentication have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
   receiving, at a computing device that executes an authentication service, an authentication request that identifies a transaction;
   determining, by the computing device, a risk associated with the transaction;
   determining, by the computing device, an authentication score based upon the risk, wherein the authentication score comprises a level of nonrepudiation that is to be met to allow the transaction; and
   determining, by the computing device, groups of authentication factors, wherein one of the groups of authentication factors is determined to meet the authentication score based on relative strengths and nonrepudiation aspect strengths of the authentication factors.

2. The method of claim 1, further comprising:
   receiving, by the computing device, authentication data from an authentication data source; and
   storing, by the computing device, the authentication data at a data store.

3. The method of claim 2, wherein the authentication data comprises
   risk data that defines the transaction and the risk associated with the transaction,
   factor data defining authentication factors, and score data defining how the authentication score is determined based upon the risk determined.

4. The method of claim 1, wherein determining the authentication score comprises analyzing the risk and analyzing score data to determine the authentication score.

5. The method of claim 1, further comprising:
receiving, by the computing device, user data that identifies a user name of a user associated with the transaction and a date of birth of the user associated with the transaction.

6. The method of claim 1, wherein the groups of authentication factors are determined further based upon a nonrepudiation connection strength associated with the transaction.

7. The method of claim 1, wherein determining the risk associated with the transaction comprises:
analyzing authentication data to determine the risk based upon an identification of the transaction included in the authentication request and a transaction definition included in the authentication data.

8. The method of claim 1, further comprising: providing, by the computing device to an entity associated with the transaction, factor group data that identifies the groups of authentication factors.

9. The method of claim 8, further comprising:
receiving, by the computing device, data input comprising a factor group choice and responses associated with the authentication factors;
determining, by the computing device, if the data input meets an authentication requirement; and
providing, by the computing device, an authentication result to the entity.

10. A system comprising:
a processor; and
a memory that stores computer-executable instructions that, when executed by the processor, cause the processor to perform operations comprising:
receiving an authentication request that identifies a transaction,
determining a risk associated with the transaction,
determining an authentication score based upon the risk, wherein the authentication score comprises a level of nonrepudiation that is to be met to allow the transaction, and
determining groups of authentication factors, wherein one of the groups of authentication factors is determined to meet the authentication score based on relative strengths and nonrepudiation aspect strengths of the authentication factors.

11. The system of claim 10, wherein the computer-executable instructions, when executed by the processor, cause the processor to perform operations further comprising:
providing, to an entity associated with the transaction, factor group data that identifies the groups of authentication factors.

12. The system of claim 11, wherein the computer-executable instructions, when executed by the processor, cause the processor to perform operations further comprising:
receiving data input comprising a factor group choice and responses associated with the authentication factors;
determining if the data input meets an authentication requirement; and
providing an authentication result to the entity.

13. The system of claim 10, wherein determining the risk associated with the transaction comprises:
analyzing authentication data to determine the risk based upon an identification of the transaction included in the authentication request and a transaction definition included in the authentication data.

14. The system of claim 10, further comprising an authentication data source and a data store.

15. The system of claim 14, wherein the computer-executable instructions, when executed by the processor, cause the processor to perform operations further comprising:
receiving authentication data from the authentication data source; and
storing the authentication data at the data store.

16. A computer storage medium having computer-executable instructions stored thereon that, when executed by a processor, cause the processor to perform operations comprising:
receiving an authentication request that identifies a transaction;
determining a risk associated with the transaction;
determining an authentication score based upon the risk, wherein the authentication score comprises a level of nonrepudiation that is to be met to allow the transaction; and
determining groups of authentication factors, wherein one of the groups of authentication factors is determined to meet the authentication score based on relative strengths and nonrepudiation aspect strengths of the authentication factors.

17. The computer storage medium of claim 16, wherein the computer-executable instructions, when executed by the processor, cause the processor to perform operations further comprising:
providing, to an entity associated with the transaction, factor group data that identifies the groups of authentication factors.

18. The computer storage medium of claim 17, wherein the computer-executable instructions, when executed by the processor, cause the processor to perform operations further comprising:
receiving data input comprising a factor group choice and responses associated with the authentication factors;
determining if the data input meets an authentication requirement; and
providing an authentication result to the entity.

19. The computer storage medium of claim 16, wherein the computer-executable instructions, when executed by the processor, cause the processor to perform operations further comprising:
receiving authentication data from an authentication data source; and
storing the authentication data at a data store.

20. The computer storage medium of claim 16, wherein the computer-executable instructions, when executed by the processor, cause the processor to perform operations further comprising receiving data input comprising:
information identifying a factor group choice from a user device; and
information corresponding to responses associated with a plurality of authentication factors associated with an authentication factor group associated with the factor group choice.

* * * * *